(12) United States Patent
Kim et al.

(10) Patent No.: US 11,720,141 B2
(45) Date of Patent: Aug. 8, 2023

(54) ELECTRONIC DEVICE INCLUDING FLEXIBLE DISPLAY

(71) Applicant: SAMSUNG ELECTRONICS CO., LTD., Suwon-si (KR)

(72) Inventors: Jungjin Kim, Suwon-si (KR); Gidae Kim, Suwon-si (KR); Jungsik Park, Suwon-si (KR); Hongsik Park, Suwon-si (KR); Hyoseok Na, Suwon-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/315,541

(22) Filed: May 10, 2021

(65) Prior Publication Data
US 2021/0263552 A1    Aug. 26, 2021

Related U.S. Application Data

(63) Continuation of application No. 16/378,924, filed on Apr. 9, 2019, now Pat. No. 11,003,207.

(30) Foreign Application Priority Data

Apr. 13, 2018  (KR) .......................... 10-2018-0043029

(51) Int. Cl.
*G06F 1/16*  (2006.01)
*G06F 3/041*  (2006.01)
(Continued)

(52) U.S. Cl.
CPC .......... *G06F 1/1601* (2013.01); *G06F 1/1652* (2013.01); *G06F 1/1686* (2013.01);
(Continued)

(58) Field of Classification Search
None
See application file for complete search history.

(56) References Cited

U.S. PATENT DOCUMENTS 6,466,202 B1 * 10/2002 Suso ..................... G06F 1/1647
                                                          345/169
D529,920 S * 10/2006 Nevill-Manning .......... D14/486
(Continued)

FOREIGN PATENT DOCUMENTS

CN       1714332 A     12/2005
CN     101594402 A     12/2009
(Continued)

OTHER PUBLICATIONS

U.S. Appl. No. 16/378,924, filed Apr. 9, 2019; Kim et al.
(Continued)

*Primary Examiner* — Patrick N Edouard
*Assistant Examiner* — Peijie Shen
(74) *Attorney, Agent, or Firm* — Nixon & Vanderhye P.C.

(57) ABSTRACT

Disclosed is an electronic device including a flexible display. The electronic device may include a first structure including a first plate, the first plate including a first surface and a second surface facing a direction opposite the first surface, a second structure including a second plate facing the second surface of the first plate and a first side wall extending from the second plate, a flexible touch screen display, and a camera device arranged between the first structure and the second structure.

21 Claims, 21 Drawing Sheets

(51) Int. Cl.
*H04N 5/225* (2006.01)
*H04N 23/54* (2023.01)
*H04N 23/57* (2023.01)

(52) U.S. Cl.
CPC ............ *G06F 3/041* (2013.01); *H04N 23/54* (2023.01); *H04N 23/57* (2023.01); *G06F 2203/04102* (2013.01)

(56) References Cited

U.S. PATENT DOCUMENTS

| | | | | |
|---|---|---|---|---|
| 7,632,025 | B2* | 12/2009 | Sung | H04M 1/0264 396/428 |
| 8,711,566 | B2 | 4/2014 | O'Brien | |
| 8,878,890 | B2 | 11/2014 | Park et al. | |
| 9,195,272 | B2 | 11/2015 | O'Brien | |
| 10,185,365 | B2 | 1/2019 | Yang | |
| 10,222,833 | B2 | 3/2019 | Kim et al. | |
| 10,691,172 | B2* | 6/2020 | Jovanovic | H10K 50/84 |
| 10,929,002 | B2* | 2/2021 | Lee | G06F 3/04883 |
| 11,003,207 | B2 | 5/2021 | Kim et al. | |
| 2004/0137958 | A1* | 7/2004 | Sawai | H04M 1/0218 455/566 |
| 2004/0212728 | A1* | 10/2004 | Tsai | H04M 1/0218 348/376 |
| 2005/0024500 | A1* | 2/2005 | Katayama | H04N 23/54 348/207.99 |
| 2005/0049019 | A1 | 3/2005 | Lee | |
| 2005/0070344 | A1* | 3/2005 | Im | H04M 1/0264 455/575.1 |
| 2007/0013555 | A1* | 1/2007 | Sung | H04M 1/0264 348/E5.025 |
| 2007/0070189 | A1* | 3/2007 | Lee | H04N 7/142 348/E7.079 |
| 2009/0298537 | A1 | 12/2009 | Choi | |
| 2011/0032407 | A1* | 2/2011 | Amano | G06F 3/0485 348/E5.022 |
| 2012/0314400 | A1* | 12/2012 | Bohn | H04M 1/0237 361/679.01 |
| 2013/0021427 | A1* | 1/2013 | Park | H04M 1/0235 348/14.02 |
| 2013/0058063 | A1* | 3/2013 | O'Brien | G06F 1/1624 361/807 |
| 2014/0211399 | A1* | 7/2014 | O'Brien | G06F 1/1652 29/592.1 |
| 2016/0026381 | A1* | 1/2016 | Kim | G06F 3/04817 715/761 |
| 2016/0165023 | A1* | 6/2016 | Song | H04M 1/0264 455/566 |
| 2016/0202781 | A1* | 7/2016 | Kim | G06F 1/1643 345/173 |
| 2017/0094168 | A1* | 3/2017 | Kang | H04N 23/667 |
| 2017/0124932 | A1* | 5/2017 | Evans, V | G06F 1/1637 |
| 2017/0126983 | A1* | 5/2017 | Yamazaki | H04N 23/56 |
| 2017/0287992 | A1 | 10/2017 | Kwak et al. | |
| 2017/0308126 | A1 | 10/2017 | Yang | |
| 2017/0310799 | A1* | 10/2017 | Lin | H04M 1/0237 |
| 2017/0344071 | A1* | 11/2017 | Lee | H04M 1/0268 |
| 2018/0159097 | A1* | 6/2018 | Fukushima | H01M 50/202 |
| 2018/0198896 | A1* | 7/2018 | Kang | G06F 1/1652 |
| 2019/0034011 | A1* | 1/2019 | Li | G06F 1/1643 |
| 2019/0268455 | A1* | 8/2019 | Baek | G06F 1/1624 |
| 2019/0305237 | A1* | 10/2019 | Shin | H10K 59/12 |
| 2019/0384438 | A1* | 12/2019 | Park | G06F 3/0482 |
| 2020/0044003 | A1* | 2/2020 | Cho | G09F 9/30 |
| 2020/0053283 | A1* | 2/2020 | Li | H04N 23/667 |
| 2020/0177773 | A1* | 6/2020 | Yoo | H04M 1/0264 |
| 2020/0233465 | A1* | 7/2020 | Li | G06F 1/1669 |
| 2020/0329131 | A1* | 10/2020 | Han | H04N 23/57 |
| 2020/0350377 | A1* | 11/2020 | Zhong | H10K 59/176 |
| 2021/0135151 | A1* | 5/2021 | Baek | H04M 1/0237 |
| 2021/0359282 | A1* | 11/2021 | Sun | H10K 71/00 |
| 2021/0405385 | A1* | 12/2021 | Zhang | H10K 59/50 |
| 2022/0115455 | A1* | 4/2022 | Qin | H10K 59/353 |

FOREIGN PATENT DOCUMENTS

| | | |
|---|---|---|
| EP | 1 551 157 | 7/2005 |
| EP | 1 553 749 A1 | 7/2005 |
| EP | 2 549 719 A1 | 1/2013 |
| EP | 3 107 270 A2 | 12/2016 |
| KR | 10-2005-0071747 | 7/2005 |
| KR | 10-2006-0097351 A | 9/2006 |
| KR | 10-0635773 | 10/2006 |
| KR | 10-2010-0028343 | 3/2010 |
| KR | 2014-0059274 A | 5/2014 |
| KR | 10-2015-0043012 | 5/2015 |
| KR | 10-2017-0076755 | 7/2017 |

OTHER PUBLICATIONS

Extended European Search Report dated Nov. 17, 2020 for EP Application No. 19785035.7.
International Search Report and Written Opinion dated Aug. 6, 2019 in counterpart International Patent Application No. PCT/KR2019/004209.
Extended European Search Report dated Mar. 10, 2022 for EP Application No. 21214483.6.
Korean Office Action dated Mar. 25, 2022 for KR Application No. 10-2018-0043029.
Chinese Office Action dated May 18, 2022 for CN Application No. 201980025577.9.
European Office Action dated Apr. 17, 2023 for EP Application No. 21214483.6.

* cited by examiner

ELECTRONIC DEVICE INCLUDING FLEXIBLE DISPLAY

CROSS-REFERENCE TO RELATED APPLICATION

This application is a Continuation of U.S. application Ser. No. 16/378,924, filed Apr. 9, 2019 (now U.S. Pat. No. 11,003,207), which claims priority to KR 10-2018-0043029, filed Apr. 13, 2018, the entire contents of which are all hereby incorporated herein by reference in their entireties.

BACKGROUND

1. Field

The disclosure relates to an electronic device including a flexible display.

2. Description of Related Art

As electronic devices equipped with independent operating system spread rapidly, the electronic devices provide various functions or services. Accordingly, the importance of a display that explicitly provides the recognition (e.g., input) and representation (e.g., output) of the information resource accompanying the function or service operation has been emphasized, and high-tech intensive displays according to various aspects have been proposed. For example, there is a flexible display mounted on an electronic device in a roll structure, where a rolled area of the flexible display of the roll structure is deployed corresponding to a structural deformation of the electronic device.

The above information is presented as background information only to assist with an understanding of the disclosure. No determination has been made, and no assertion is made, as to whether any of the above might be applicable as prior art with regard to the disclosure.

SUMMARY

In the implementation of a flexible display in which a rolled partial area is deployed, at least some of the electronic components accommodated in an electronic device may be required to have an arrangement or mounting structure corresponding to the flexible display structure and to address the internal space limitation of the electronic device.

Aspects of the disclosure address at least the above-mentioned problems and/or disadvantages and provide at least the advantages described below. Accordingly, an example aspect of the disclosure is to provide an electronic device including a flexible display, in which the position of a camera mounted on the electronic device can be shifted corresponding to a structural deformation of the electronic device resulting from the deployment of the rolled flexible display.

In accordance with an example aspect of the disclosure, an electronic device may include a first structure including a first plate, the first plate including a first surface and a second surface facing a direction opposite the first surface, a second structure including a second plate facing the second surface of the first plate and a first side wall extending from the second plate, a flexible touch screen display, and a camera arranged between the first structure and the second structure.

According to an embodiment, the first structure may be movable between an open state and a closed state with respect to the second structure in a first direction with respect to the second plate.

According to an embodiment, the first structure may be located at a first distance from the first side wall in the closed state of the first structure and the first structure may be located at a second distance greater than the first distance from the first side wall in the open state of the first structure.

According to an embodiment, the flexible touch screen display may include a planar portion extending across at least a portion of the first surface and mounted on the first surface, the planar portion having a first width in a second direction perpendicular to the first direction, and a bendable portion extending to the planar portion and located in a space between the first side wall and the first structure from the planar portion in the closed state of the first structure.

According to an embodiment, the bendable portion may include a first portion extending to one end of the planar portion and having a width equal to the first width.

According to an embodiment, based on the first structure transitioning from the closed state to the open state, the first portion of the bendable portion viewed from above the first plate may be drawn from the space between the first side wall and the first structure to form a substantially planar surface between the planar portion and the first side wall.

According to an embodiment, the camera device may rotate to face at least one of the first structure or the second structure corresponding to the state transition of the first structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description taken in conjunction with the accompanying drawings, in which.

In regard to the description of the drawings, the same or corresponding elements may be given the same reference numerals.

DETAILED DESCRIPTION

Figure 1A:
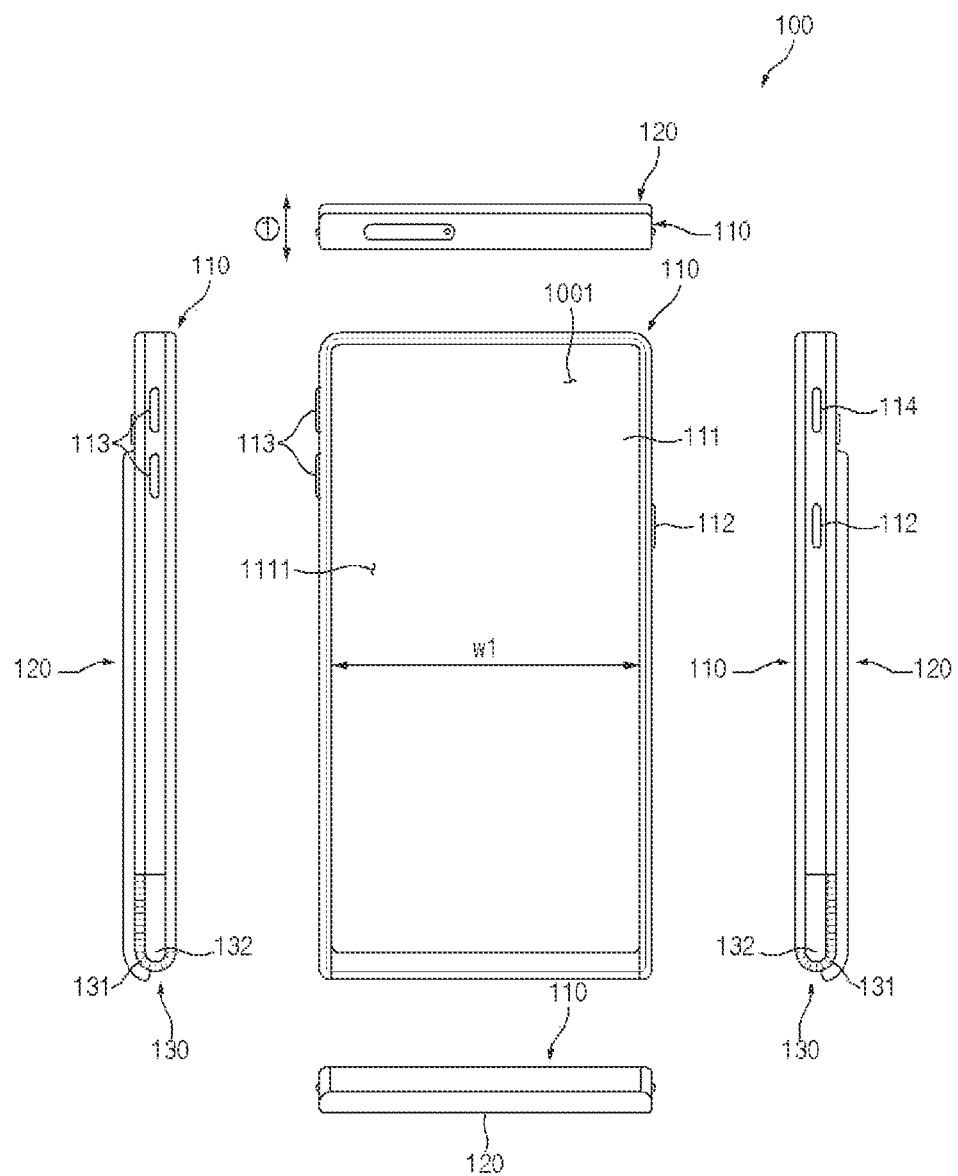
FIGS. 1A and 1B are diagrams illustrating a front display area of an example electronic device according to an embodiment.

Hereinafter, various example embodiments of the disclosure may be described with reference to accompanying drawings. Accordingly, those of ordinary skill in the art will recognize that various modifications, equivalents, and/or alternatives on the various example embodiments described herein may be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. On the other hand, when a component (e.g., a first component) is referred to as being "directly coupled with/to" or "directly connected to" another component (e.g., a second component), it should be understood that there is no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other parts. For example, a "processor configured to (or set to) perform A, B, and C" may refer, for example, and without limitation, to a dedicated processor (e.g., an embedded processor) for performing a corresponding operation, a generic-purpose processor (e.g., a central processing unit (CPU) or an application processor) which performs corresponding operations by executing one or more software programs which are stored in a memory device, or the like.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, and without limitation, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices, or the like. According to various embodiments, the wearable device may include, for example, and without limitation, at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), a bio-implantable type (e.g., an implantable circuit), or the like.

According to various embodiments, the electronic device may, for example, and without limitation, be a home appliance. The home appliances may include, for example, and without limitation, at least one of televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to various embodiments, an electronic device may include, for example, and without limitation, at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, internet of things (e.g., light bulbs, various sensors, electric or gas meters, sprinkler devices, fire alarms, thermostats, street lamps, toasters, exercise equipment, hot water tanks, heaters, boilers, and the like), or the like.

According to various embodiments, the electronic device may include, for example, and without limitation, at least one of parts of furniture or buildings/structures, electronic boards, electronic signature receiving devices, projectors, various measuring instruments (e.g., water meters, electricity meters, gas meters, or wave meters, and the like), or the like. According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Prior to describing the disclosure in detail, a structural form of an example electronic device to which various embodiments of the disclosure may be applied will be described with reference to FIGS. 1A to 4. However, it will be understood that the example electronic devices to which the disclosure may be applied are not limited to the examples illustrated in FIGS. 1A to 4 below.

Figure 1B:
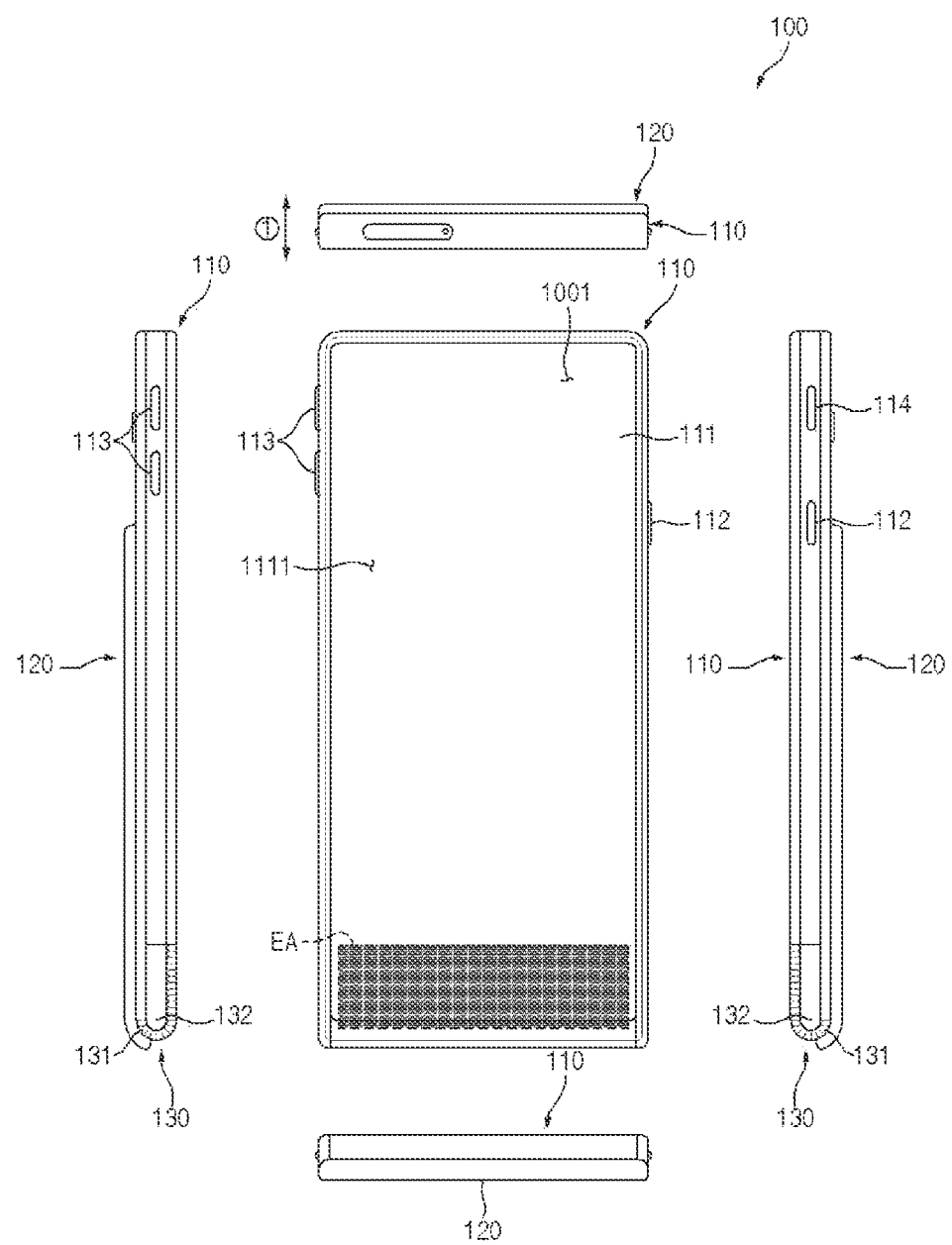

FIGS. 1A and 1B are diagrams illustrating a front display area of an example electronic device according to an embodiment. In FIG. 1A, an electronic device 100 may be understood to be in a state in which a first structure 110 is in a closed state with respect to a second structure 120, and in FIG. 1B, the electronic device 100 may be understood to be in a state in which the first structure 110 is in an open state with respect to the second structure 120.

Referring to FIGS. 1A and 1B, the electronic device 100 may include the first structure 110 and the second structure 120. For example, the first structure 110 may be arranged to be reciprocatable by a specified distance with respect to the second structure 120 in a direction ① as shown.

According to various embodiments, the electronic device 100 may include a display 111 arranged on a front surface 1001 of the first structure 110. According to an embodiment, the display 111 may include a front display area 1111 that is at least partially exposed through the front surface 1001 of the first structure 110. According to an embodiment, the electronic device 100 may include at least one key button 112 and/or 113 arranged on at least one of a left or right side surface. According to an embodiment, the at least one key button 112 and/or 113 may be arranged to be exposed to a side surface of the electronic device 100 and/or to protrude from the side surface. According to an embodiment, the at least one key button 112 and/or 113 may include, for example, and without limitation, the power button 112 or the volume control button 113. According to an embodiment, the electronic device 100 may include at least one speaker module 114 arranged on one side surface. In various embodiments, the at least one speaker module 114 may be arranged in various areas except for an arrangement area of the display 111 as well as one side surface of the electronic device 100.

According to various embodiments, the electronic device 100 may include a rollable module (e.g., a roller comprising various structural elements such as, for example, and without limitation, a multi joint rail, or the like) 130 arranged at the boundary of the first and second structures 110 and 120. According to an embodiment, the rollable module 130 is rotatably arranged between the first and second structures 110 and 120 corresponding to the reciprocating motion of the first structure 110 in the direction ①. According to an embodiment, the rollable module 130 may include an inner support member 132, at least a portion of which may be exposed to the side surface of the electronic device 100, and a multi-joint module 131 arranged on an end of the inner support member 132 in a rolling form. According to an embodiment, the multi joint module 131 may move together when the first structure 110 reciprocates with respect to the second structure 120 in the direction ①, thereby guiding the display 111.

According to various embodiments, when the electronic device 100 is transitioned to the open state as the first structure 110 moves by the specified distance in the direction ① with respect to the second structure 120, the front display area 1111 of the display 111, which is exposed to the front surface 1001, may be expanded by an area EA having a specified area.

Figure 2A:
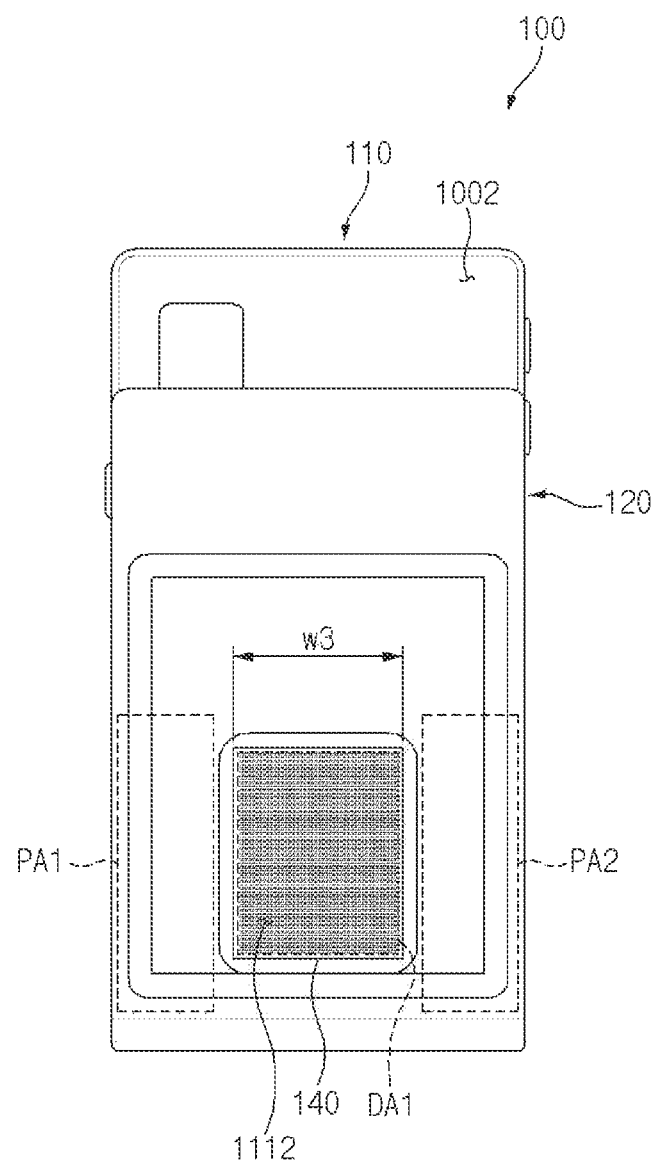
FIGS. 2A and 2B are diagrams illustrating a rear display area of an example electronic device according to an embodiment.
Figure 2B:
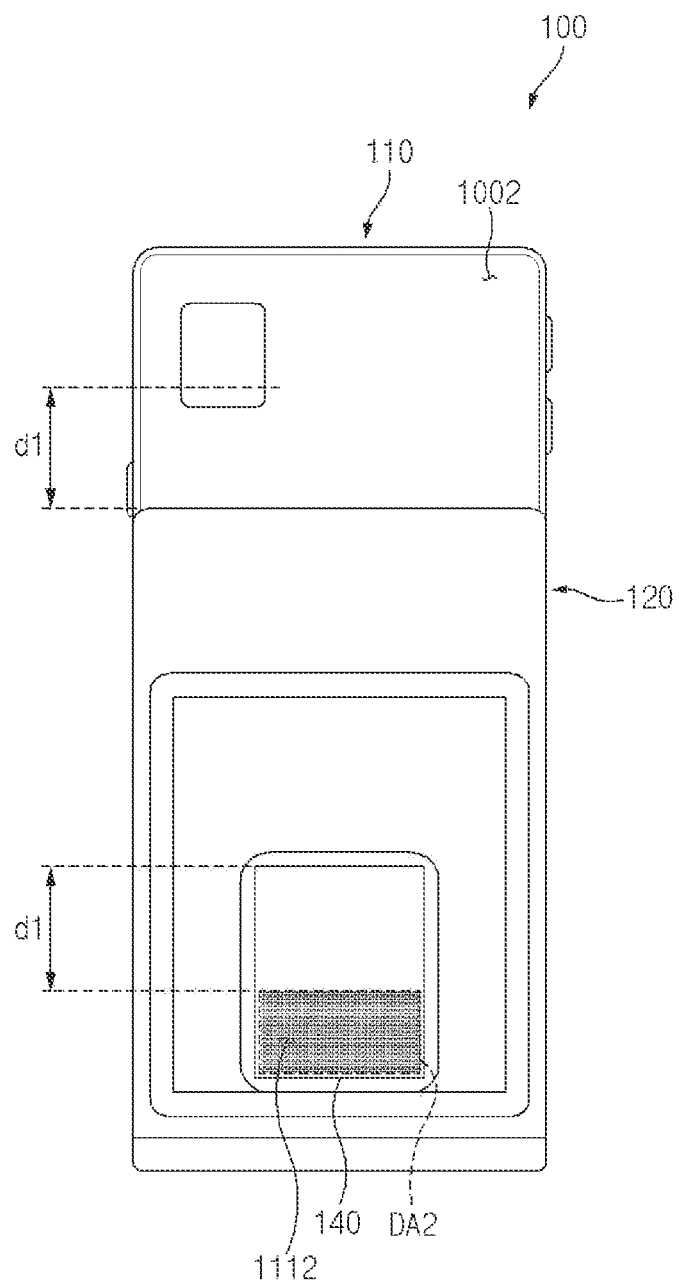

FIGS. 2A and 2B are diagrams illustrating a rear display area of an example electronic device according to an embodiment. In FIG. 2A, the electronic device 100 may be understood to be in a state in which the first structure 110 is in the closed state with respect to the second structure 120, and in FIG. 2B, the electronic device 100 may be understood to be in a state in which the first structure 110 is in the open state with respect to the second structure 120.

Referring to FIGS. 2A and 2B, the electronic device 100 may include the second structure 120 that is relatively movably arranged to the reciprocating motion of the first structure 110 described above to a rear surface 1002. According to an embodiment, the electronic device 100 may include a rear display area 1112 that may be visible through a through-hole 140 formed in the second structure 120. For example, the rear display area 1112, which is at least a part of the display (e.g., 111 of FIG. 1A) of the electronic device 100, may be an area extending from the front display area (e.g., 1111 in FIG. 1A) of the display 111. In other words, although the electronic device 100 includes the front and rear display areas 1111 and 1112 on the front surface (e.g., 1001 of FIG. 1A) and the rear surface 1002, the front and rear display areas 1111 and 1112 may be areas implemented when a single display 111 is arranged in the form of being rolled from the front surface 1001 to the rear surface 1002 inside the electronic device 100. According to an embodiment, when the first structure 110 is maintained in the closed state with respect to the second structure 120, the entire area DA1 of the rear display area 1112 may be implemented as a screen display area for displaying an arbitrary screen. Correspondingly, when the first structure 110 moves by a specified distance dl with respect to the second structure 120 to be maintained in the open state, the area DA2 excluding the area corresponding to the movement of the first structure 110 of the specified distance dl from the entire area DA1 may be implemented as the screen display area. However, the screen display area on the rear display area 1112 is not limited to the one described above and may be implemented as areas of various positions or areas depending on the design of the electronic device 100 (e.g., the location of the through-hole 140, the moving distance of the first structure 110, and the like) or the setting of a user.

According to various embodiments, the rear display area 1112 may have a width w3 that is smaller than that (e.g., w1 of FIG. 1A) of the front display area 1111. According to an embodiment, referring to FIGS. 2A and 2B, the electronic device 100 may include a printed circuit board arranged in an upper end internal area of the first structure 110 and at least one electronic component (e.g., an antenna, a microphone, a speaker, an input/output interface connector port, various sockets, an ear jack assembly, or the like) arranged in a lower end internal area of the second structure 120. In addition, the electronic device 100 may include an electrical connecting member (e.g., a flexible printed circuit board) that supports electrical connection between the printed circuit board and the at least one electronic component, and the electrical connecting member may be arranged in an area (e.g., a peripheral area PA1 and/or PA2 of the through-hole 140) avoiding the through-hole 140.

Figure 3:
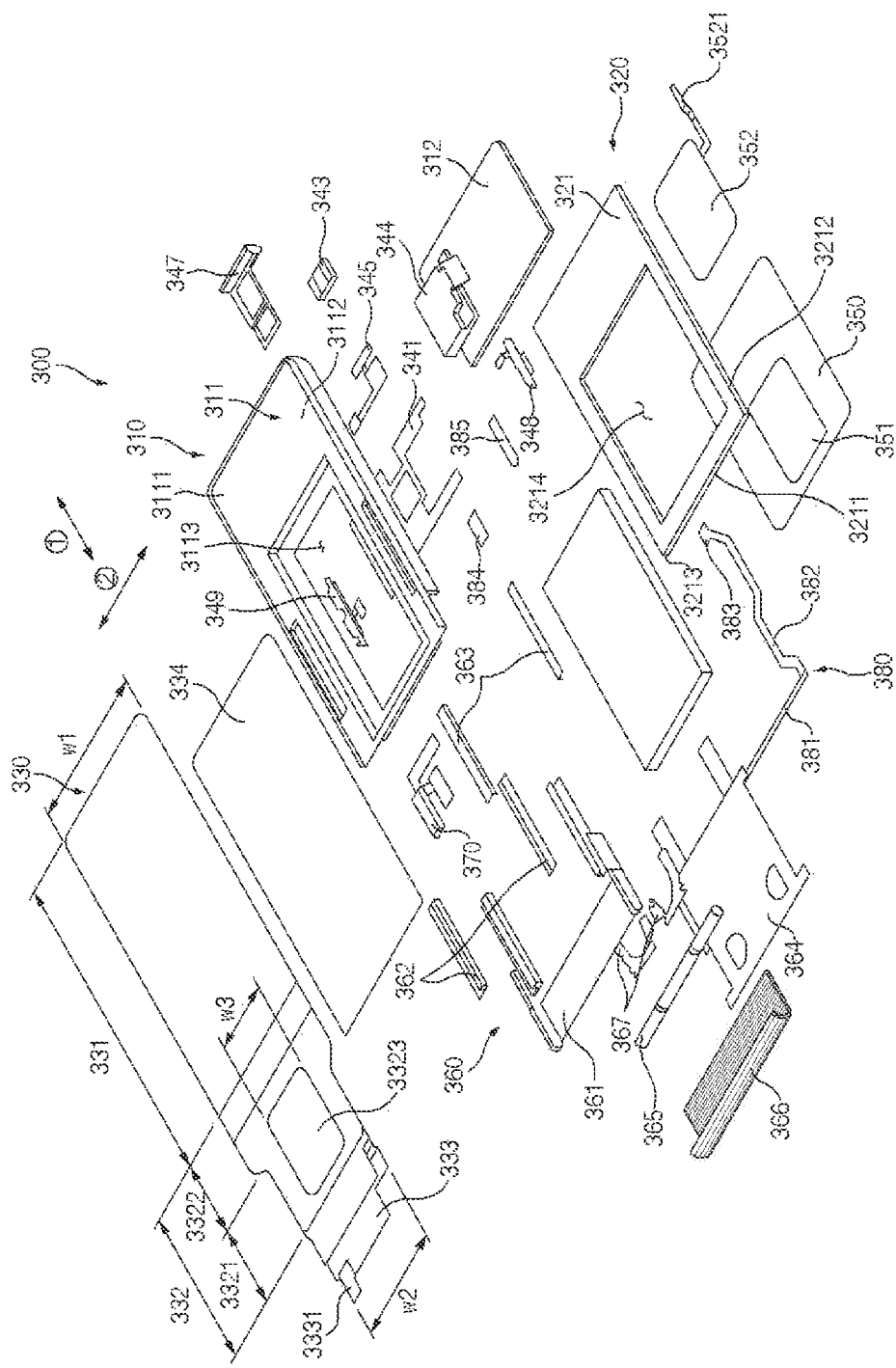
FIG. 3 is an exploded view illustrating an example electronic device according to an embodiment.

FIG. 3 is an exploded view illustrating an example electronic device according to an embodiment. An electronic device 300 described with reference to FIG. 3 may be at least partially the same as or similar to the electronic device 100 described above in FIG. 1A, 1B, 2A, or 2B.

Referring to FIG. 3, the electronic device 300 may include a first structure 310 including a first plate 311. The first plate 311 may include a first surface 3111 and a second surface 3112 facing the first surface 3111. According to an embodiment, the electronic device 300 may include a second structure 320. For example, the second structure 320 may include a second plate 321 facing the second surface 3112 of the first plate 311, a first side wall 3211 extending perpendicularly from one side end of the second plate 321, a second side wall 3212 perpendicular to the first side wall 3211 and the second plate 321, and a third side wall 3213 perpendicular to the first side wall 3211 and the second plate 321 and parallel to the second side wall 3212. According to various embodiments, the second plate 321, the first side wall 3211, the second side wall 3212, and the third side wall 3213 may comprise the second structure 320 together with an opening 3214 for receiving at least a portion of the first structure 310.

According to an embodiment, the electronic device 300 may include a display 330 (e.g., a flexible touch screen display) which extends across at least a portion of the first surface 3111 of the first plate 311 and is interposed between the second surface 3112 of the first plate 311 and the second plate 321 through the first side wall 3211 of the second structure 320. According to an embodiment, the electronic device 300 may include a rollable module 360 for slidably connecting the first plate 311 and the second plate 321 and for guiding the movement of the display 330 interposed through the first side wall 3211 of the second structure 320.

According to various embodiments, the first structure 310 may reciprocate into the open and closed states with respect to the second structure 320 in the direction①parallel to the second plate 321 and the second side wall 3212. Thus, the first structure 310 may be located at a first distance from the first side wall 3211 of the second structure 320 in the closed state and may be located at a second distance, which may be relatively larger than the first distance, from the first side wall 3211 in the open state.

According to various embodiments, the display 330 may include a planar portion 331 and a bendable portion 332. For example, the planar portion 331 may extend across at least a portion of the first surface 3111 of the first plate 311, and the extended portion may be mounted on the first surface 3111. The planar portion 331 may have a first width w1 in the direction② perpendicular to the direction①. For example, the bendable portion 332 may extend from the planar portion 331 to a space between the first side wall 3211 of the second structure 320 and the first structure 310 in a state that the first structure 310 is closed. According to an embodiment, when the first structure 310 transitions from the open state to the closed state, a first portion 3321 of the bendable portion 332 facing the second plate 321 may have a second width w2 that may be relatively shorter than the first width w1 in the direction②. According to an embodiment, at least one region (e.g., the first portion 3321) of the bendable portion 332 may be exposed through the opening 3214 formed in the second plate 321. For example, when the first structure 310 is in the closed state with respect to the second structure 320, a screen display area 3323 included in the bendable portion 332 may be located at a position corresponding to the opening 3214 of the second plate 321, thereby exposing at least a portion through the opening 3214. According to an embodiment, the screen display area 3323 may have a third width w3 substantially similar to a through-hole 351 of a window cover 350 arranged on the rear surface of the second structure 320, where the third width w3 may be implemented to be shorter than the second width w2. According to an embodiment, when the first structure 310 is transitioned from the closed state to the open state, a second portion 3322 of the bendable portion 332, which is viewed from above the first plate 311, may be drawn by a specified length from the space between the first side wall 3211 and the first structure 310 to form a substantially plane between the planar portion 331 and the first side wall 3211 of the second structure 320.

According to various embodiments, the first plate 311 of the first structure 310 may include a battery mounting portion (e.g., a bracket). The battery mounting portion may include, for example, an opening 3113 for compensating for a volume change due to the swelling phenomenon of the battery.

According to an embodiment, the electronic device 300 may include a front support member 334 which is arranged between the first plate 311 and the planar portion 331 of the display 330 to support the planar portion 331 of the display 330. In other words, the front support member 334 may be arranged above the battery mounted on the battery mounting portion of the first plate 311. In an embodiment, one surface of the front support member 334 may be bonded to the display 330 in a bonding or taping scheme, and another surface may be fixed to the first surface 3111 of the display 330 in a screw, bonding or taping scheme, but the disclosure is not limited thereto.

According to various embodiments, the window cover 350 for shielding the opening 3214 formed in the second structure 320 may be arranged in one area of the second plate 321 of the second structure 320. According to an embodiment, the window cover 350 includes the through-hole 351 (e.g., a substantially transparent or translucent window) having a size corresponding to the screen display area 3323 included in the bendable portion 332 of the display 330. For example, when the first structure 310 is in the open state, the window cover 350 may include a translucent material such that the interior of the electronic device 300 is not visible. According to an embodiment, a touch sensor 352 for detecting a user input (e.g., a touch, a drag, a press, hovering, or the like) may be arranged in an area corresponding to the through-hole 351. For example, a connector 3521 of the touch sensor 352 may be connected to a circuit portion 333 of the display 330. The touch sensor 352 may be electrically connected to a printed circuit board 341 through a connector 3331 connected to the circuit portion 333 of the display 330.

According to various embodiments, a rear window 312 may be arranged on the second surface 3112 of the first plate 311 in such a manner that at least a portion thereof overlaps the second plate 321. According to an embodiment, the electronic device 100 may include at least one electronic component arranged in a space between the rear window 312 and the first plate 311. In various embodiments, the at least one electronic component may include at least one of the printed circuit board 341, a receiver 343, a speaker 344, a sensor module 345 (e.g., an illuminance sensor, a proximity sensor, an infrared sensor, an ultrasonic sensor, a fingerprint recognition sensor, a facial recognition sensor, an iris recognition sensor, or the like), a card tray 347, or at least one key module 348 and/or 349 (e.g., a power key module 348 and/or a volume control key module 349).

According to various embodiments, the rollable module 360 may include a sub-support member 364 fixed to the second plate 321, an inner support member 361 arranged to be rotatable (or slidable) with respect to each other between the sub-support member 364 and the second surface 3112 of the first plate 311, a roller 365 formed on an end of the inner support member 361 to have a length corresponding to the first side wall 3211 of the second structure 320 and arranged to be rotatable, a multi-joint module 366 for guiding the rear surface of the display 330 under the guidance of the roller 365, a pair of first rails 362 arranged between the inner support member 361 and the sub-support member 364, and a pair of second rails 363 arranged between the inner support member 361 and the second surface 3112 of the first plate 311. According to an embodiment, the first and second rails 362 and 363 may be arranged to induce the inner support member 361 to perform a sliding movement relative to the sub-support member 364 and the first plate 311. According to an embodiment, the multi joint module 366 may include a plurality of unit multi-bars, and the plurality of unit multi-bars may be connected to each other to interwork with each other, thereby being bent along an outer peripheral surface of the roller 365. According to an embodiment, the bendable portion 332 of the display 330 may be guided in such a manner that the bendable portion 332 is rolled (or bent), such that an end of the bendable portion 332 is fixed to the sub-support member 364 arranged between the second surface 3112 of the first plate 311 and the second plate 321. According to an embodiment, the electronic device 300 may include at least one actuator 367 arranged between the inner support member 361 and the sub-support member 364 and/or between the inner support member 361 and the first plate 311. For example, the at least one actuator 367 may provide a continuous pressing force in a direction in which the first structure 310, which is opened or closed in sliding manner from the second structure 320, is opened or closed based on a certain bent portion.

According to various embodiments, the electronic device 300 may include an antenna module 380. For example, the antenna module 380 may be arranged on the first side wall 3211 of the second structure 320. According to an embodiment, the antenna module 380 may include a radiation pattern 381 arranged inside the first side wall 3211, a flexible printed circuit board 382 extending from the radiation pattern 381 to an area adjacent to the printed circuit board 341, and a connector 383 arranged on an end of the flexible printed circuit board 382. In various embodiments, the radiation pattern 381 may be arranged inside the first side wall 3211 in the form of a laser direct structuring (LDS), a thin film antenna (TFA), a flexible printed circuit board (FPCB), a steel use stainless (SUS), or the like, but is not limited thereto. According to an embodiment, the flexible printed circuit board 382 of the antenna module 380 may be arranged avoiding the through-hole 351 of the window cover 350. In an embodiment, the flexible printed circuit board 382 of the antenna module 380 may be electrically connected to a sub flexible printed circuit board 384 arranged on the sub-support member 364 in an area adjacent to the printed circuit board 341. The sub flexible printed circuit board 384 may be electrically connected to a wireless communication circuit through a coaxial cable 385 electrically connected to a wireless communication circuit (e.g., an RFIC) of the printed circuit board 341. In this regard, the radiation pattern 381 may be electrically connected to the wireless communication circuit on the printed circuit board 341 through the flexible printed circuit board 382 of the antenna module 380, the connector 383 of the antenna module 380, the sub flexible printed circuit board 384, the coaxial cable 385, and the printed circuit board 341. According to an embodiment, because the sub-support member 364 to which the sub printed circuit board 384 is fixed moves correspondingly when the first structure 310 is opened or closed, the coaxial cable 385 may be formed of a material having an excellent bending property. Alternatively, the coaxial cable 385 may be replaced with a flexible printed circuit board implemented with an excellent bending property material.

According to various embodiments, the circuit portion 333 of the display 330 may be at least partially fixed to the sub-support member 364. The connector 3331 extending from the circuit portion 333 of the display 330 may be electrically connected to the printed circuit board 341 fixed to the connector 3521 of the touch sensor 352 or the first plate 311 based on an electrical connection member 370. According to an embodiment, because the distance between the circuit portion 333 of the display 330 fixed to the sub-support member 364 and the printed circuit board 341 is changed corresponding to the opening and closing of the first structure 310, the electrical connection member 370 may include a flexible printed circuit board having an excellent bending or stretching property to correspond to the distance change.

Figure 4:
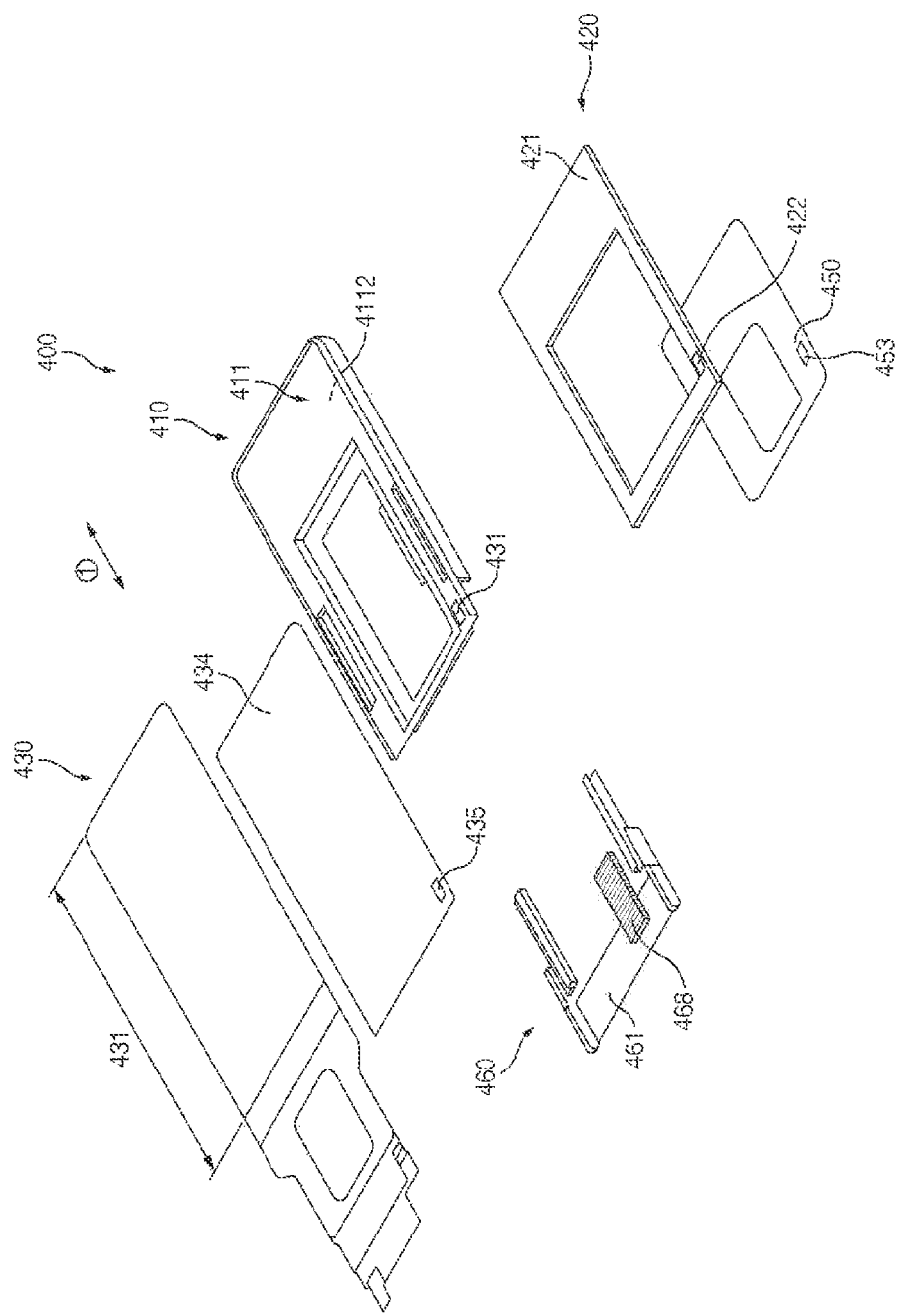
FIG. 4 is an exploded view illustrating another structure of some components of an example electronic device according to an embodiment.
Figure 5A:
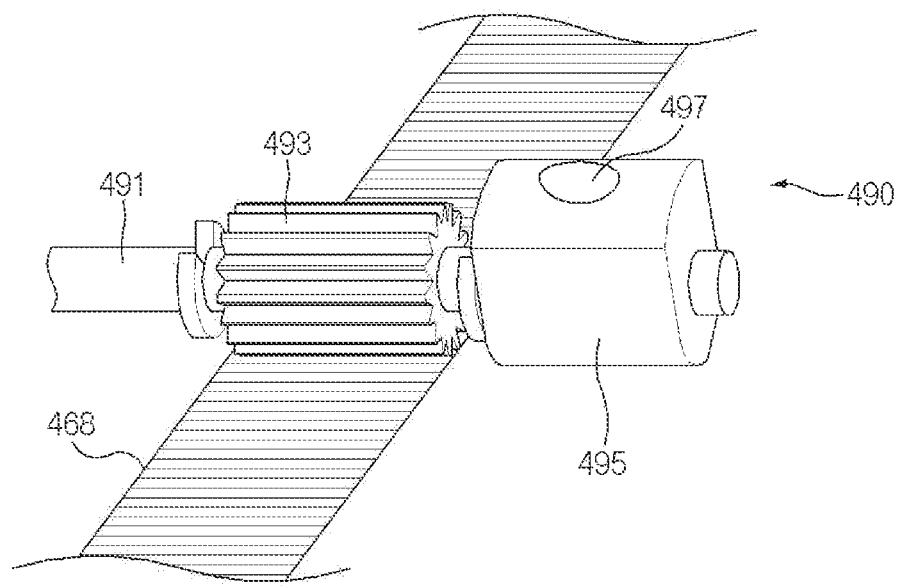
FIG. 5A is a diagram illustrating an example camera device of an example electronic device according to an embodiment.
Figure 5B:
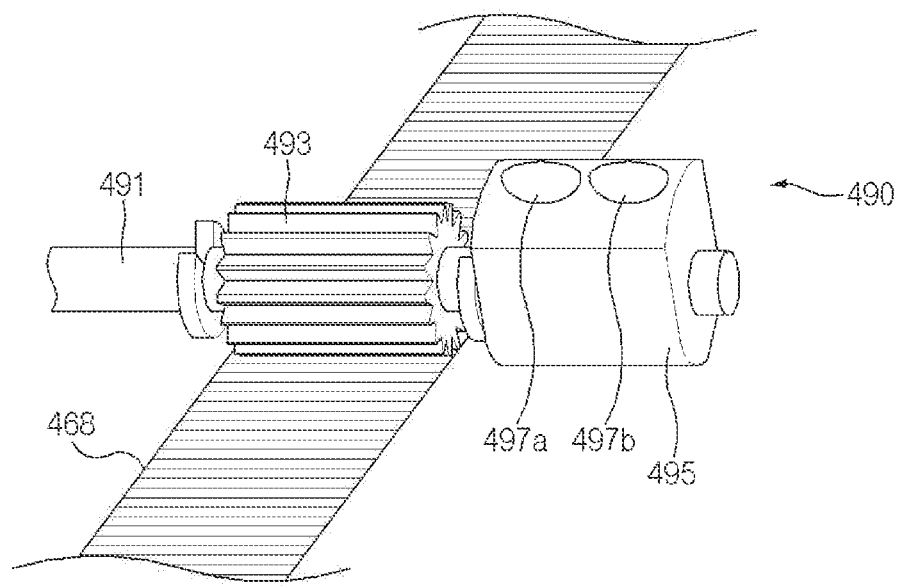
FIG. 5B is a diagram illustrating an example camera device of an example electronic device according to another embodiment.

FIG. 4 is an exploded view illustrating another structure of some components of an example electronic device according to an embodiment, and FIGS. 5A and 5B are diagrams illustrating an example camera device of an example electronic device according to various embodiments. An electronic device 400 described with reference to FIG. 4 may be at least partially the same as or similar to the electronic device 100 described above in FIG. 1A, 1B, 2A, or 2B, or the electronic device 300 described in FIG. 3, and may include other embodiments for at least some components.

Referring to FIGS. 4 and 5A, the electronic device 400 may include a camera device 490 which is rotatably arranged in an inner space of the electronic device 400 to photograph an image forward (e.g., an upward direction based on a first structure 410) and rearward (e.g., a downward direction based on a second structure 420) of the electronic device 400. For example, the camera device 490 may be arranged on an inner support member 461 of a rollable module 460 which slides with respect to a second surface 4112 of a first plate 411 based on a second rail (363 of FIG. 3), and may move in a direction corresponding to the sliding movement of the inner support member 461. In this operation, at least a part of the camera device 490 may be engaged with a multi-joint rail 468 arranged in at least one area of the inner support member 461, and may move in the direction of motion of the inner support member 461 while being rotated at a specified rotation amount.

According to an embodiment, the camera device 490 may include a shaft 491 whose one end is connected to one area of the inner support member 461, a gear 493 through which the shaft 491 passes, and a camera module 495 arranged on an opposite end of the shaft 491 to be coupled with the gear 493. According to an embodiment, the shaft 491 may be moved corresponding to the sliding movement of the inner support member 461, and the gear 493 may be pulled in accordance with the movement of the shaft 491 and may be rotated on the multi-joint rail 468 in engagement with the multi joint rail 468. Thus, the camera module 495 coupled to the gear 493 may be rotated by the amount of rotation of the gear 493 and the location of a lens 497 may be changed (e.g., rotated). Although the camera module 495 including the single lens 497 is illustrated in FIG. 5A, according to various embodiments, the lens 497 may be implemented as a plurality of lens. For example, as illustrated in FIG. 5B, depending on the manufacturing specification (e.g., dual camera mount) of the electronic device 400, the camera module 495 may include a plurality of lenses 497a and 497b.

According to an embodiment, when the first structure 410 is maintained in the closed state with respect to the second structure 420, at least one component arranged over the camera device 490 located at a first position may include an aperture of a specified size to support the angle of view of the lens 497 facing in front of the electronic device 400. For example, the first plate 411 of the first structure 410 may include an aperture 431 in an area corresponding to the first position of the camera device 490, and a front support member 434 arranged over the first plate 411 may also include an aperture 435 corresponding to the first position of the camera device 490. According to an embodiment, a planar portion 431 of a display 430 arranged over the front support member 434 may be structurally improved in an area corresponding to the first position of the camera device 490 to support a front view angle of the lens 497, and it will be described later.

Similar to the above description, when the first structure 410 is kept in the open state with respect to the second structure 420, at least one component arranged below the camera device 490 located at the second position may include an aperture to support the angle of view of the lens 497 facing rearward of the electronic device 400. For example, a second plate 421 of the second structure 420 may include an aperture 422 in an area corresponding to the second location of the camera device 490, and a window cover 450 arranged below the second structure 420 may also include an aperture 453 in an area corresponding to the second position of the camera device 490. According to various embodiments, the apertures 431, 435, 422 and 453, which are formed on at least one component arranged over the camera device 490 located at the first position and at least one component arranged below the camera device 490 located at the second location, may be formed to have a size capable of exposing the lens 497 to an outside, depending on whether the lens 497 is single or plural.

Figure 6:
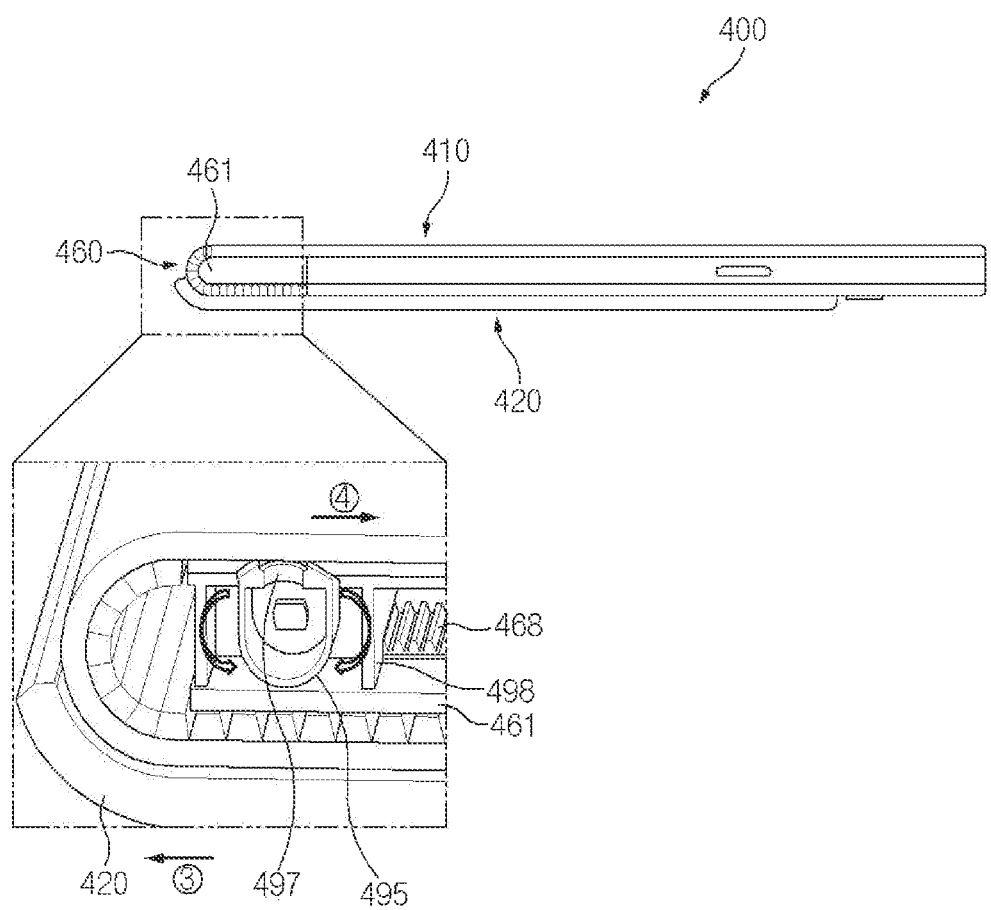
FIG. 6 is a diagram illustrating a position change form of an example camera device according to an embodiment.

FIG. 6 is a diagram illustrating a position change form of a camera device according to an embodiment. The enlarged region in FIG. 6 may be understood as an internal cross-section with respect to one side (e.g., the right side with respect to the front side (1001 of FIG. 1A) of the electronic device 400) of the electronic device 400.

Referring to the description of FIG. 3, the sub-support member (364 of FIG. 3) of the rollable module (360 of FIG. 3) may be fixed to the second plate (321 of FIG. 3) of the second structure (320 of FIG. 3) in at least one area, and may be movable below the inner support member (361 in FIG. 3) of the rollable module 360 in the direction①. For example, both ends of the sub-support member 364 may be fastened to a pair of first rails (362 in FIG. 3) fixed to both ends of the inner support member 361 in a screw scheme, and may be movable in the direction① along the first rail 362. In this case, the inner support member 361 may move in the direction② by sliding motion corresponding to the movement of the sub-support member 364. For example, the inner support member 361 may be fastened to a pair of second rails (363 of FIG. 3) fixed to both ends of the first plate (311 in FIG. 3) of the first structure (310 of FIG. 3) and moves along the second rail 363 in the direction① corresponding to the movement of the sub-support member 364 by an external force.

Referring to FIGS. 3, 5A and 6 in connection with the above description, an external force (e.g., a physical force by a user body holding the electronic device 400) for opening the first structure 410 may be applied to the second structure 420. In this case, as the sub-support member (364 of FIG. 3) connected to the second plate (321 in FIG. 3) of the second structure 420 moves along the first rail (362 of FIG. 3) fixed to the inner support member 461 of the rollable module 460, the second structure 420 may move in the direction 3̄. In addition, the inner support member 461 of the rollable module 460 may move in the direction③ along the second rail (363 in FIG. 3) fixed to the first plate (311 in FIG. 3) of the first structure 410, corresponding to the movement of the second structure 420 in the direction③ (alternatively, corresponding to the movement of the sub-support member 364 connected to the second plate 321 of the second structure 420). In an embodiment, the movement of the inner support member 461 in the direction③ may pull the multi-joint rail 468 arranged in one area of the inner support member 461 in the direction③. In this case, the multi joint rail 468 pulled in the direction③ may be engaged with the gear (493 of FIG. 5A) of the camera device (490 of FIG. 5A) connected to the inner support member 461 to rotate the gear 493. Accordingly, the camera module 495 coupled with the gear 493 of the camera device 490 may be rotated by the amount of rotation (or rotational motion) of the gear 493 on the multi joint rail 468 to change the position of the lens 497. For example, the rotation of the camera module 495 may change the position of the lens 497 toward the second structure 420.

Similar to the above description, when the external force for closing the first structure 410 opened acts on the second structure 420, the second structure 420 may move in the direction④. The inner support member 461 may move in the direction ④ along the second rail 363 fixed to the first plate 311 of the first structure 410, corresponding to the movement of the second structure 420 in the direction④. In an embodiment, the multi joint rails 468 arranged on the inner support member 461 may be pulled in the direction④ corresponding to the movement of the inner support member 461 in the direction④. In this operation, the gear 493 of the camera device 490 may be rotated while being engaged with the pulled multi-joint rail 468, and may rotate the camera module 495 fastened to the gear 493. The rotation (or the rotation amount) of the camera module 495 may change the position of the lens 497 included in the camera module 495 toward the first structure 410.

Based on the above description, when an external force for opening the first structure 410 acts on the second structure 420, the sub-support member (364 in FIG. 3) of the rollable module 460 and the inner support member 461 may move in the direction of③ along the first rail (362 in FIG. 3) and the second rail (363 in FIG. 3), respectively, so that the second structure 420 may move in the direction③. In this case, the first structure 410 and the second structure 420 may have positional relationship that the first structure 410 moves relatively in the direction④ as the second structure 420 moves in the direction③. Alternatively, when an external force for closing the first structure 410 acts on the second structure 420, the sub-support member 364 and the inner support member 461 of the rollable module 460 may move in the direction④, along the first and second rail 362 and 363, respectively so that the second structure 420 may move in the direction④. In this case, the first structure 410 and the second structure 420 may have positional relationship that the first structure 410 moves relatively in the direction③ as the second structure 420 moves in the direction④.

According to various embodiments, a camera device cover 498 for containing at least a part of the camera device 490 connected to the inner support member 461 may be included in an area of the inner support member 461. For example, the camera device cover 498 may receive an internal hardware component (e.g., the camera module 495, a portion of a shaft (491 of FIG. 5A), a gear (493 of FIG. 5A), or the like), and the internal hardware component may be shielded from an outside to block foreign substances such as dust, and the like from flowing thereinto. According to various embodiments, the camera device cover 498 may include an aperture through which a part of the shaft 491 of the camera device 490 passes, and a peripheral portion of the shaft 491 passing through the aperture may be sealed with a separated adhesive material or the like.

Figure 7A:
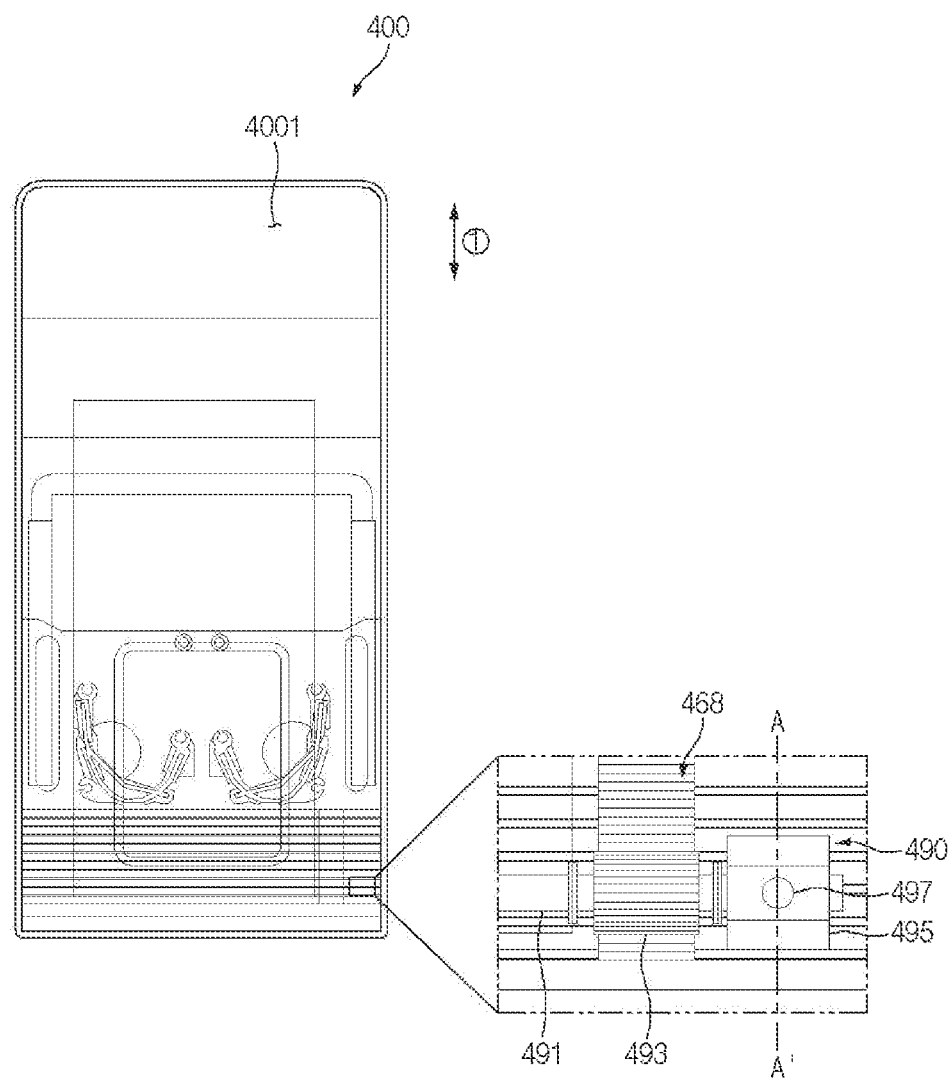
FIG. 7A is a perspective diagram illustrating a front surface of an example electronic device according to an embodiment.
Figure 7B:
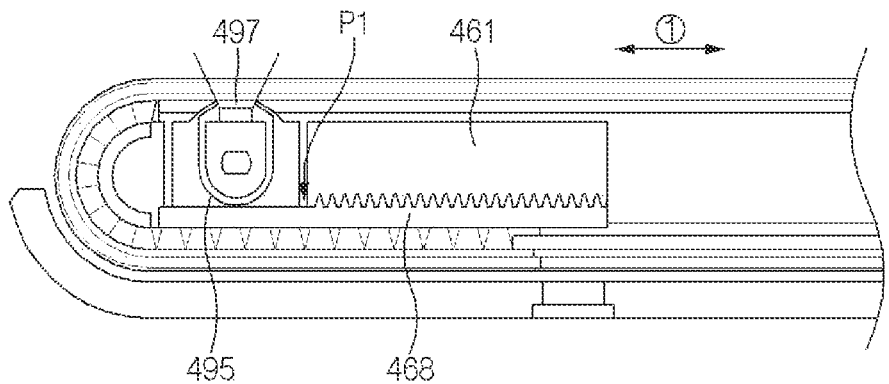
FIG. 7B is a cross-sectional view taken along line A-A' of FIG. 7A.
Figure 7C:
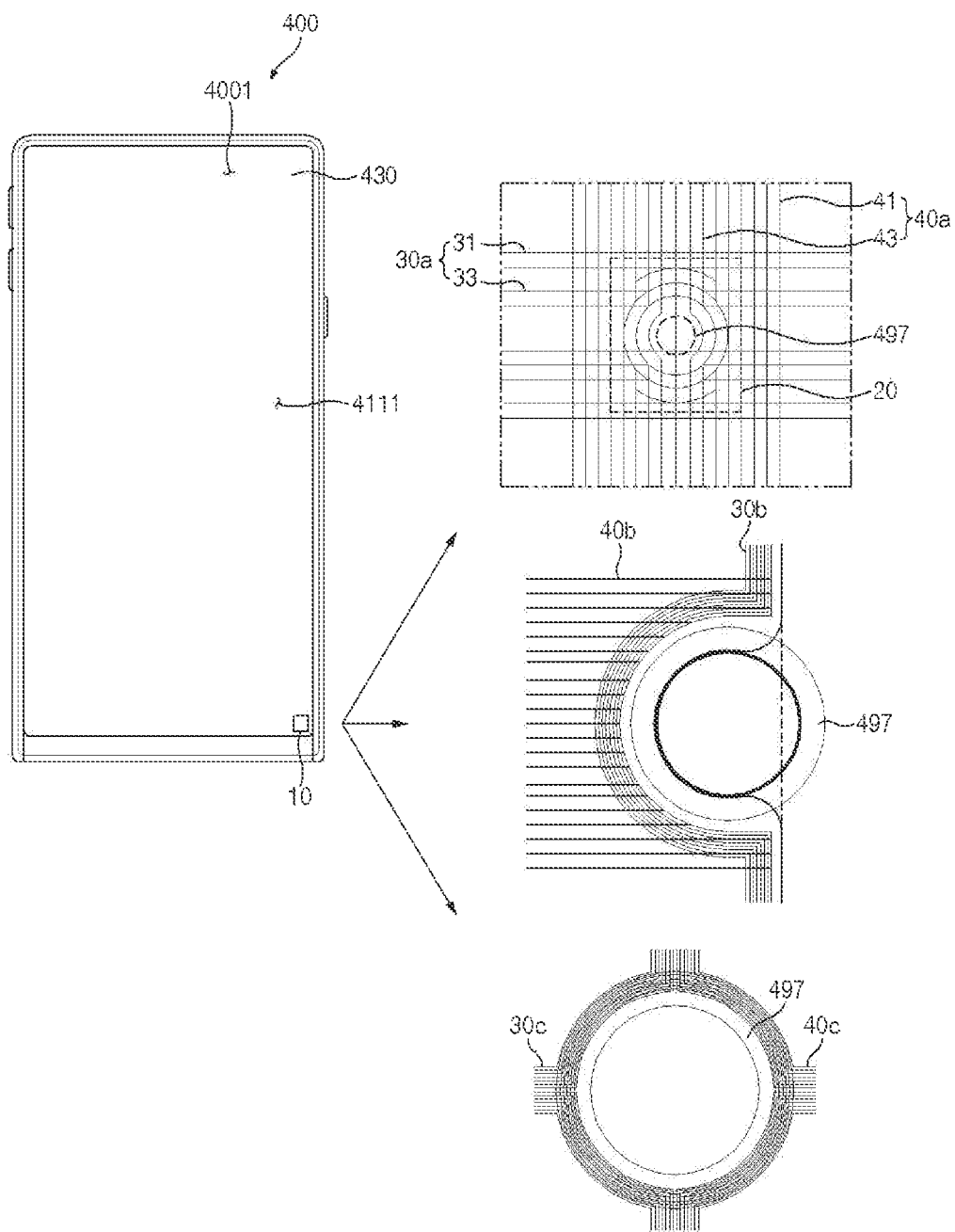
FIG. 7C is a diagram illustrating a front display area of an example electronic device according to an embodiment.

FIG. 7A is a perspective diagram illustrating a front surface 4001 of an example electronic device according to an embodiment. FIG. 7B is a cross-sectional view taken along line A-A' of FIG. 7A. FIG. 7C is a diagram illustrating a front display area of an example electronic device according to an embodiment.

Referring to FIGS. 7A and 7B, the electronic device 400 may mount the camera device 490 in an internal area thereof. In an embodiment, the camera device 490 may be arranged to overlap at least partially with the inner support member 461 which is slidably arranged in a lower area with respect to a front surface 4001 in the direction ①. For example, the camera device 490 may be arranged to allow the shaft 491 to be connected to one area of the inner support member 461 and the gear 493 to be engaged with the multi joint rail 468 arranged in the inner support member 461.

In an embodiment, the camera device 490 may be located at a first position P1 on the multi joint rail 468 when the electronic device 400 (or the first structure (410 of FIG. 6)) is kept in the closed state. In addition, the camera device 490 may be arranged such that the lens 497 of the camera module 495 faces the front surface 4001 of the electronic device 400 at the first position P1. In other words, in the closed state of the electronic device 400, the gear 493 of the camera device 490 may be arranged to be engaged with the multi-joint rail 468 such that the camera device 490 is located at the first position P1 and the lens 497 of the camera module 495 faces the front surface 4001, which may be implemented in the manufacturing process of the electronic device 400. In this regard, at least one component (e.g., the first plate (411 of FIG. 4) and/or the front support member (434 of FIG. 4), and the like) may include an aperture (e.g., the aperture (413 of FIG. 4) formed in the first plate 411 and/or an aperture 435 formed in the front support member 434) for supporting the angle of view of the lens 497 of the camera module 495.

Referring to FIG. 7C, a first area 10 corresponding to the first position P1 in a front display area 4111 of the display 430 arranged above the camera device 490 may be at least partially improved to support the angle of view of the lens 497. For example, a first gate line 31 or a first data line 41 of the display 430 arranged in the first area 10 may be implemented in a shape of a straight line, and at least a portion of a second gate line 33 or a second data line 43 may be implemented in shape of a curved line. In other words, the portion of the second gate line 33 or the second data line 43 arranged in a second area 20 related to the angle of view of the lens 497 may be provided in a shape of a curved line to avoid the lens 497. Alternatively, a portion of the display 430 corresponding to the first area 10 may be removed by U-cut or punching. For example, the conductive line of the display 430 including a gate line 30b or 30c and a data line 40b or 40c may be designed to be at least partially bent in the peripheral area of the lens 497 not to overlap with the lens 497. According to the above description, due to the conductive line 30a, 30b, 30c, 40a, 40b or 40c of the display 430 designed to avoid the lens 497 or not to overlap with the lens 497, the amount of received light and the angle of view of the lens 497 may be secured.

Figure 8A:
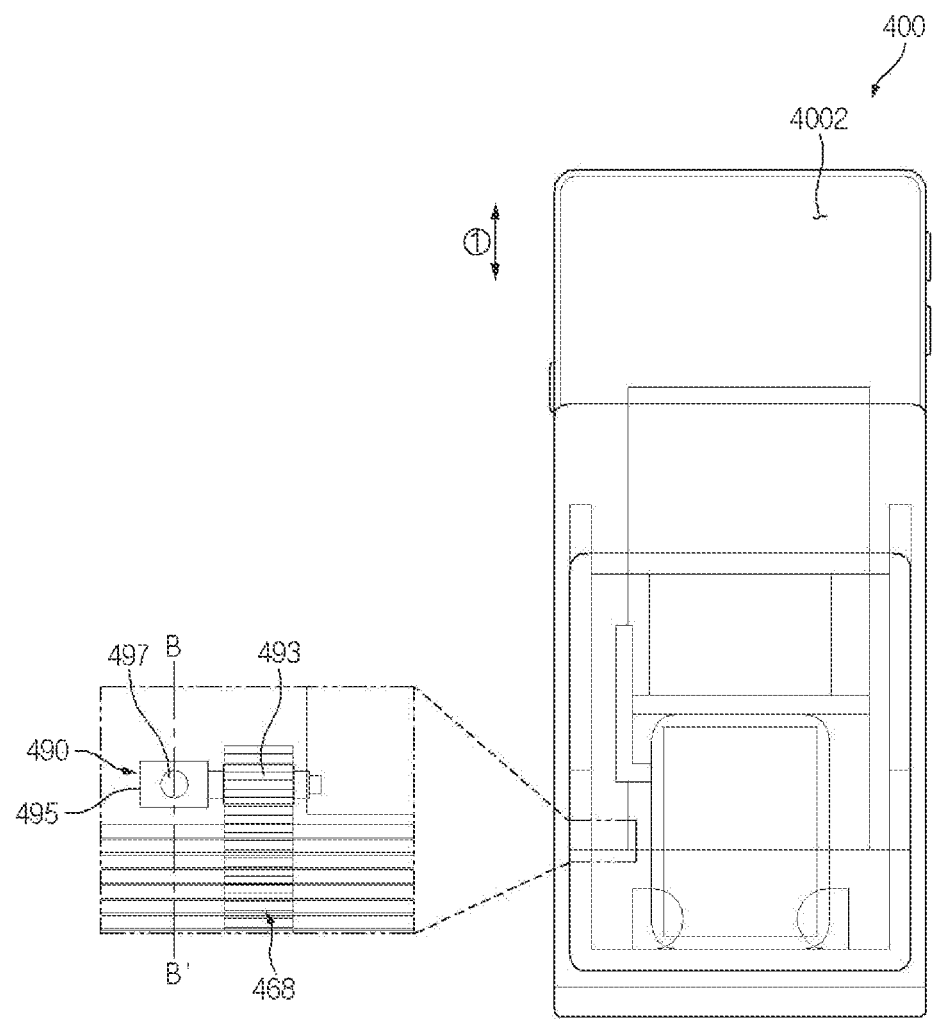
FIG. 8A is a perspective diagram illustrating a rear surface of an example electronic device according to an embodiment.
Figure 8B:
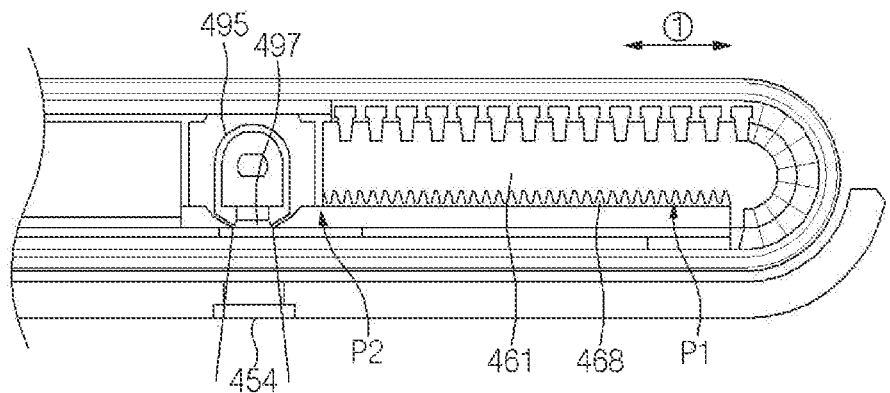
FIG. 8B is a sectional view taken along line B-B' of FIG. 8A.

FIG. 8A is a perspective diagram illustrating a rear surface 4002 of an example electronic device according to an embodiment. FIG. 8B is a sectional view taken along line B-B' of FIG. 8A.

FIGS. 8A and 8B, the camera device 490 may be located at a second position P2 on the multi joint rail 468 arranged on the inner support member 461 when the electronic device 400 (or the first structure (410 of FIG. 6)) is in the open state. For example, when the first structure 410 is transitioned into the open state by the movement of the second structure (420 of FIG. 6) in the direction①, the second position P2 may be spaced apart from the first position P1 described above by the movement distance. In this regard, when the second structure 420 moves in the direction① in order to transition the first structure 410 into the open state, the inner support member 461 may move in the direction of movement of the second structure 420. Accordingly, the multi-joint rail 468 arranged in one area of the inner support member 461 may be pulled in the direction of movement of the second structure 420, and the camera device 490 may be relatively positioned on the multi joint rail 468 in accordance with the traction of the multi-joint rail 468 to be positioned at the second position P2. The traction of the multi-joint rail 468 may rotate the gear 493 of the camera device 490 engaged with the multi-joint rail 468 to rotate the camera module 495 fastened to the gear 493, so that the position of the lens 497 of the camera module 495 may be changed. For example, the lens 497 of the camera module 495 may be positioned to face the rear surface 4002 of the electronic device 400. To this end, the gear 493 may be designed to have a corresponding periphery or rotation amount such that the lens 497, which faces the front surface (4001 of FIG. 7A) of the electronic device 400 at the first position P1, faces the rear surface 4002 of the electronic device 400 at the second position P2.

In an embodiment, at least one component (e.g., the second plate (421 of FIG. 4) and/or the window cover (450 of FIG. 4)) arranged under the camera device 490 at the second position P2 may include an aperture for supporting the angle of view of the camera module 495 (e.g., the aperture (422 of FIG. 4) formed in the second plate 421, the aperture 453 formed in the window cover 450, or the like). In various embodiments, the aperture (453 of FIG. 4) of the window cover 450 arranged at the lowermost portion of the camera device 490 at the second position P2 may be substantially shielded by a transparent window 454.

Figure 9A:
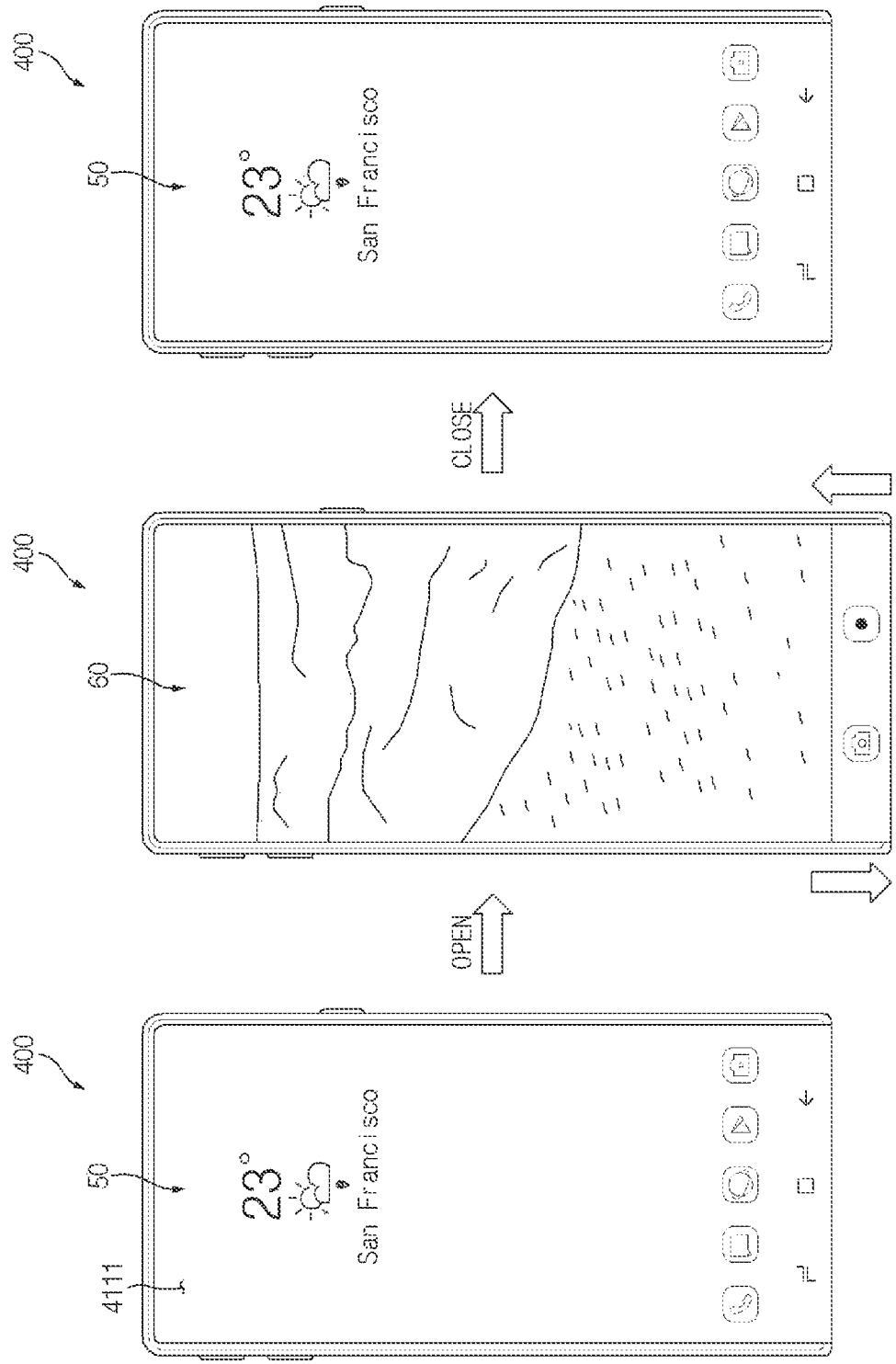
FIG. 9A is a diagram illustrating a first operation example of an example electronic device according to an embodiment.
Figure 9B:
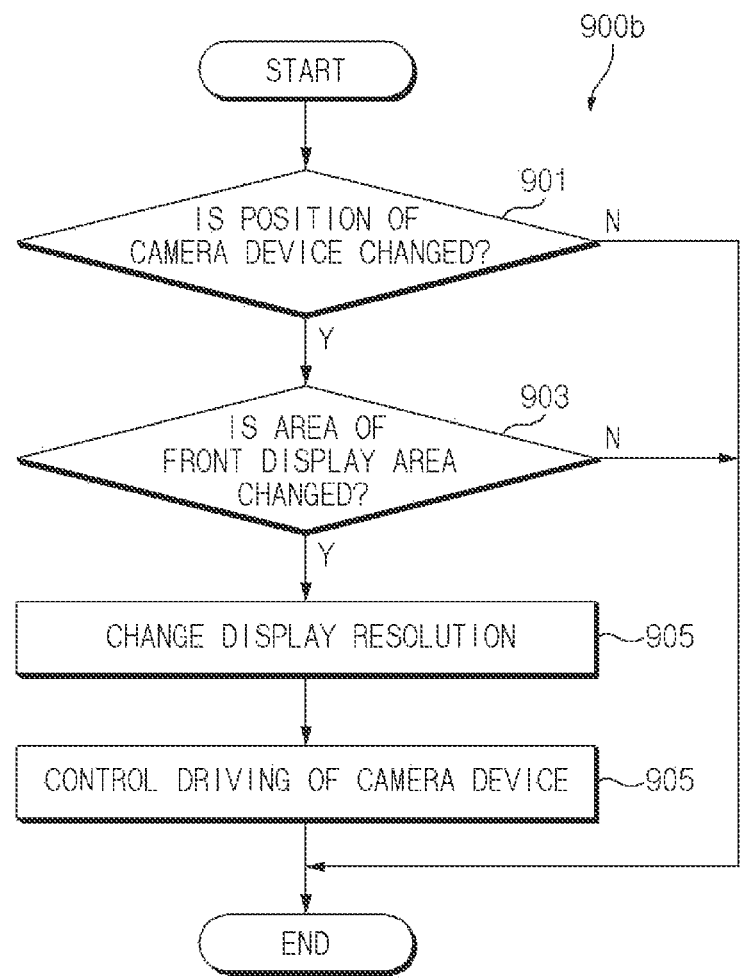
FIG. 9B is a flowchart illustrating an example operating process of an electronic device related to the first operation example according to an embodiment.

FIG. 9A is a diagram illustrating a first operation example of an example electronic device according to an embodiment. FIG. 9B is a flowchart illustrating an example operating process 900b of an electronic device related to the first operation example according to an embodiment.

Figure 10:
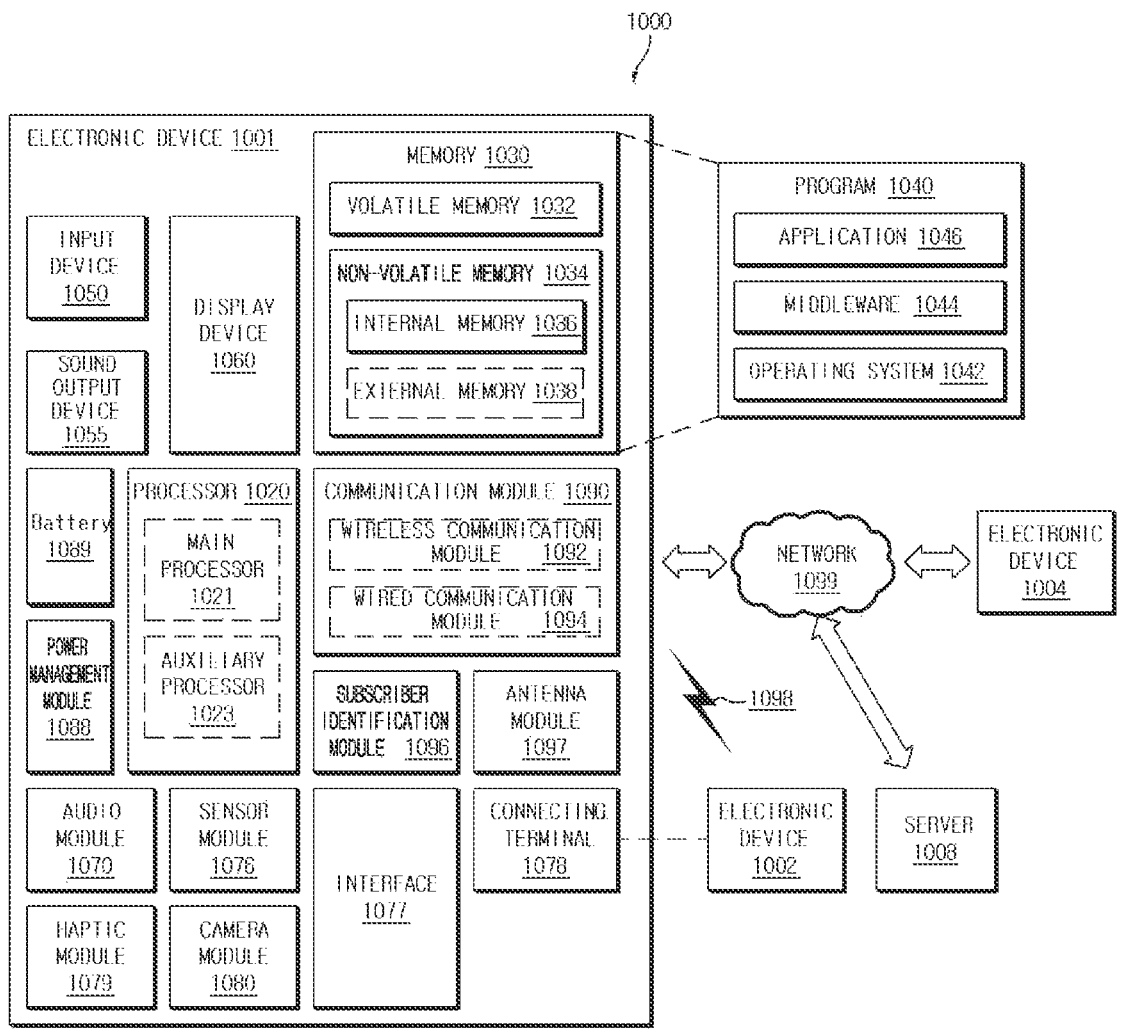
FIG. 10 is a diagram illustrating an example electronic device in a network environment according to an embodiment.

According to an embodiment, the electronic device 400 may be electrically or functionally connected to the above-described camera device (490 of FIG. 5A or FIG. 5B), and may include at least one processor (e.g., a processor (e.g., including processing circuitry) 1020 of FIG. 10) that performs control or data processing concerned with the functional operation of the camera device 490. In an embodiment, the processor may control the operation of the camera device 490 based on the open and closed states of the electronic device 400. In this regard, for example, the position information of the camera device 490 and/or the second structure (120 of FIG. 1A) according to each of the open and closed states of the electronic device 400 may be stored in the memory (e.g., the memory 1030 of FIG. 10) of the electronic device 400.

Referring to FIGS. 9A and 9B, in operation 901, the processor of electronic device 400 may determine a position change of the camera device 490. In this regard, a first sensor (e.g., an acceleration sensor, a gyro sensor, or the like) configured to sense the position of the camera device 490 may be included in one area of the camera device 490.

When it is determined that the position of the camera device 490 is changed based on the position information provided from the first sensor, in operation 903, the processor may determine an area change of the front display area 4111 of the electronic device 400. In an embodiment, the area change determination of the front display area 4111 may be based on the position information of the second structure 120. In this regard, a second sensor (e.g., a position sensor or the like) configured to sense the movement of the second structure 120 may be included in one area of the second structure 120. The processor may determine whether the electronic device 400 is in the open or closed state by the movement of the second structure 120 based on the position information provided from the second sensor. In an embodiment, when the electronic device 400 is transitioned from the closed state to the open state by external force, the processor may determine that the area of the front display area 4111 is expanded and the lens (497 of FIG. 6) of the camera device 490 faces toward the rear (or the second structure 120) of the electronic device 400. Alternatively, when the electronic device 400 is transitioned from the open state to the closed state, the processor may determine that the area of the front display area 4111 is reduced and the lens 497 of the camera device 490 faces toward the front (or the first structure (110 of FIG. 1A)) of the electronic device 400.

In operation 905, the processor may change the resolution of the display (e.g., the display device 1060 of FIG. 10) of the electronic device 400 in accordance with the area change of the front display area 4111. For example, the processor may set or manage the pixels included in the front display area 4111 whose area has been changed, or change the configuration (e.g., the density (dpi) or total size of the screen, and the like) of the screen to be displayed through the front display area 4111 whose area is changed.

In operation 907, the processor may control the driving of the camera device 490 corresponding to the determined open or closed state of the electronic device 400 (or, the determined area of the front display area 4111). For example, when the electronic device 400 is transitioned from the closed state to the open state in operation 903 and it is determined that the lens 497 of the camera device 490 faces toward the rear of the electronic device 400, the processor may control the driving of the camera device 490 to activate the image photographing function for the rear (e.g. a still image, a video, or the like). In this operation, the processor may switch a first screen 50 (e.g., a home screen of the electronic device 400) displayed on the front display area 4111 when the electronic device 400 is in the closed state to an image photographing screen 60. When the electronic device 400 is transitioned from the open state to the closed state again, the processor may control the operation of the camera device 490 to deactivate the image photographing function and switch the image photographing screen 60 displayed on the front display area 4111 to the previous first screen 50.

Figure 9C:
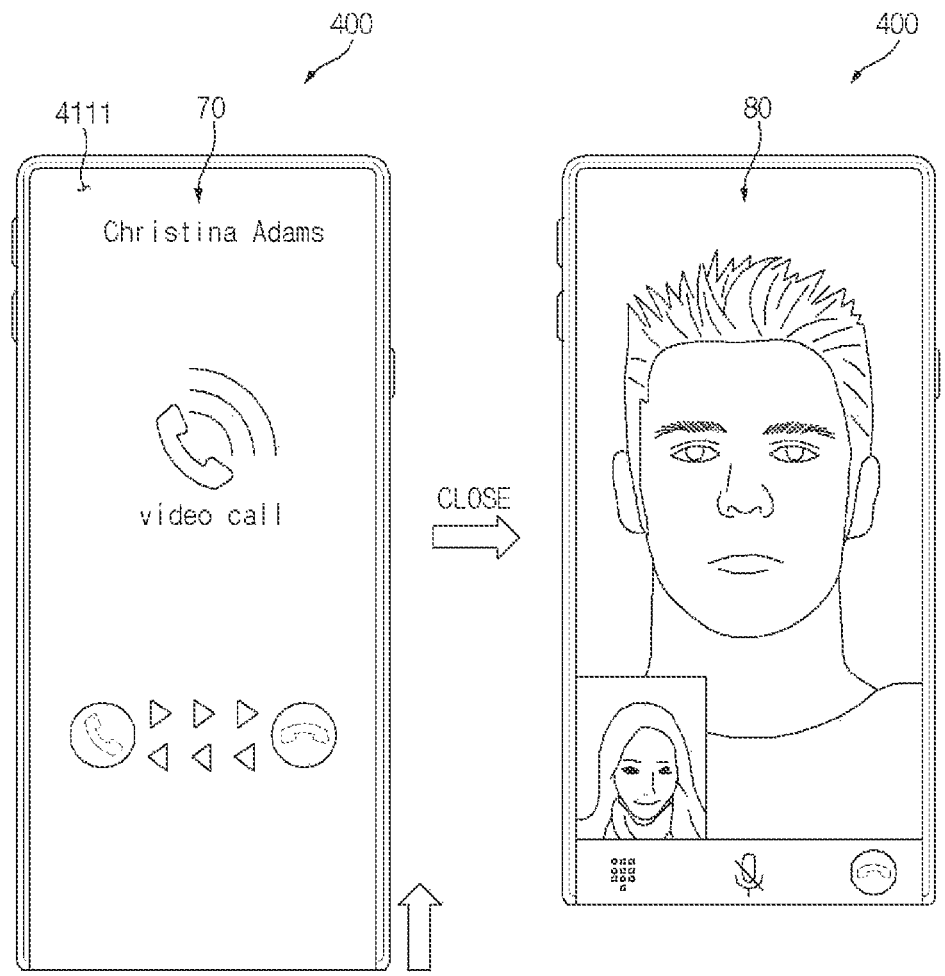
FIG. 9C is a diagram illustrating a second operation example of an example electronic device according to an embodiment.
Figure 9D:
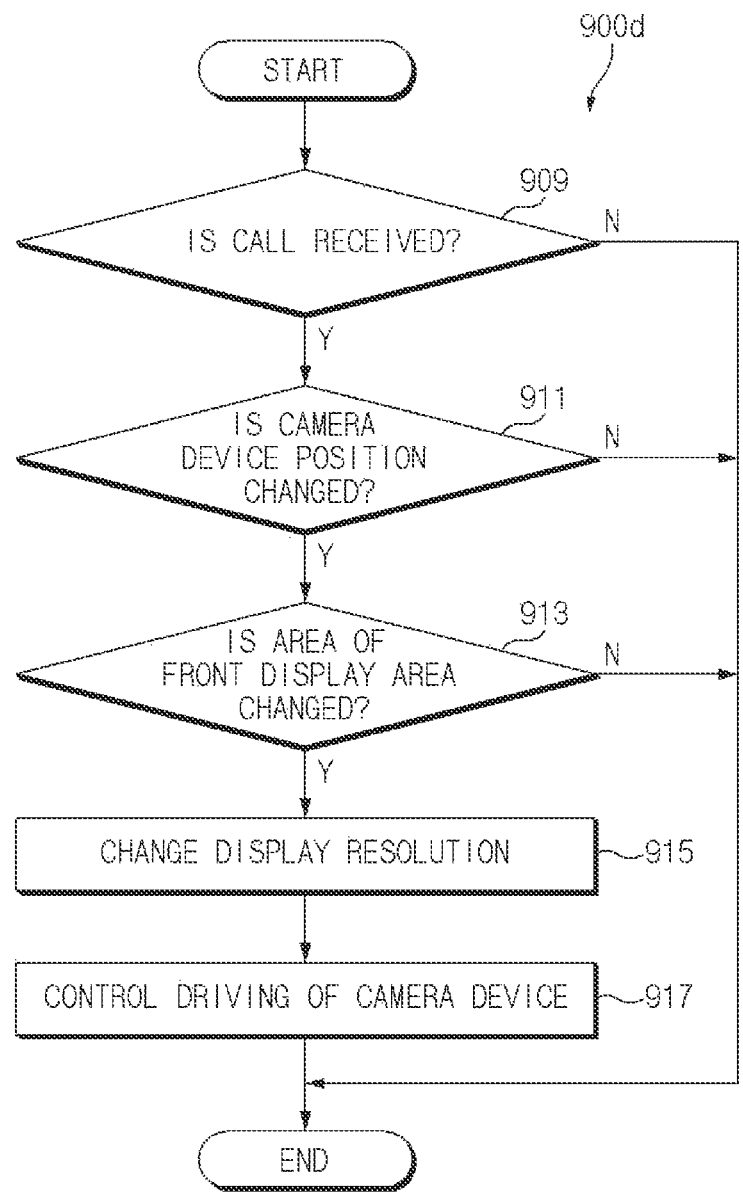
FIG. 9D is a flowchart illustrating an example operation process of the electronic device related to the second operation example according to an embodiment.

FIG. 9C is a diagram illustrating a second operation example of an example electronic device according to an embodiment. FIG. 9D is a flowchart illustrating an operation process 900d of the electronic device related to the second operation example according to an embodiment. The operations described with reference to FIG. 9D may be performed at least partially the same as or similar to the operations described with reference to FIG. 9B, and redundant descriptions may not be repeated below.

Referring to FIGS. 9C and 9D, in operation 909, the processor of the electronic device 400 may determine whether a call is received from an external device. According to an embodiment, the call may relate to a video call function using the camera device (490 of FIG. 5A or 5B) mounted on the electronic device 400.

When it is determined that the call is received, in operation 911, the processor may determine whether the position of the camera device 490 is changed. For example, the processor may receive the position information of the camera device 490 from the first sensor (e.g., an acceleration sensor, a gyro sensor, or the like) included in one area of the camera device 490 to determine whether the position of the camera device 490 is changed.

When it is determined that the position of the camera device 490 is changed, in operation 913, the processor may determine whether the area of the front display area 4111 of the electronic device 400 is changed. In this regard, the processor may obtain the positional information of the second structure 120 from the second sensor (e.g., a position sensor, or the like) included in the second structure (120 of FIG. 1A) of the electronic device 400, and may determine whether the electronic device 400 is in the open or closed state by the movement of the second structure 120, based on the position information. In an embodiment, when it is determined that the electronic device 400 is in the open state, the area of the front display area 4111 may be expanded and the processor may determine that the lens (497 of FIG. 6) of the camera device 490 faces toward the rear of the electronic device 400. Alternatively, when the electronic device 400 is determined to be in the closed state, the area of the front display area 4111 may be reduced and the processor may determine that the lens 497 of the camera device 490 faces toward the front of the electronic device 400.

In operation 913, the processor may change the resolution of the display (e.g., the display device 1060 of FIG. 10) of the electronic device 400 corresponding to the area change of the front display area 4111.

In operation 917, the processor may control the driving of the camera device 490 in response to the determined open or closed state of the electronic device 400 (or the determined area of the front display area 4111). For example, when the call is received, when it is determined that the electronic device 400 is transitioned from the open state to the closed state such that the camera device 490 faces toward the front of the electronic device 400 (or the first structure (110 of FIG. 1A)), the processor may control the driving of the camera device 490 to activate the function of photographing an image in the forward direction. In this operation, when the electronic device 400 is in the open state, the processor may switch a first screen 70 (e.g., a video call receiving screen) related to the call reception displayed through the front display area 4111 to a video call screen 80 for photographing at least a part of a user located in front of the electronic device 400.

Figure 9E:
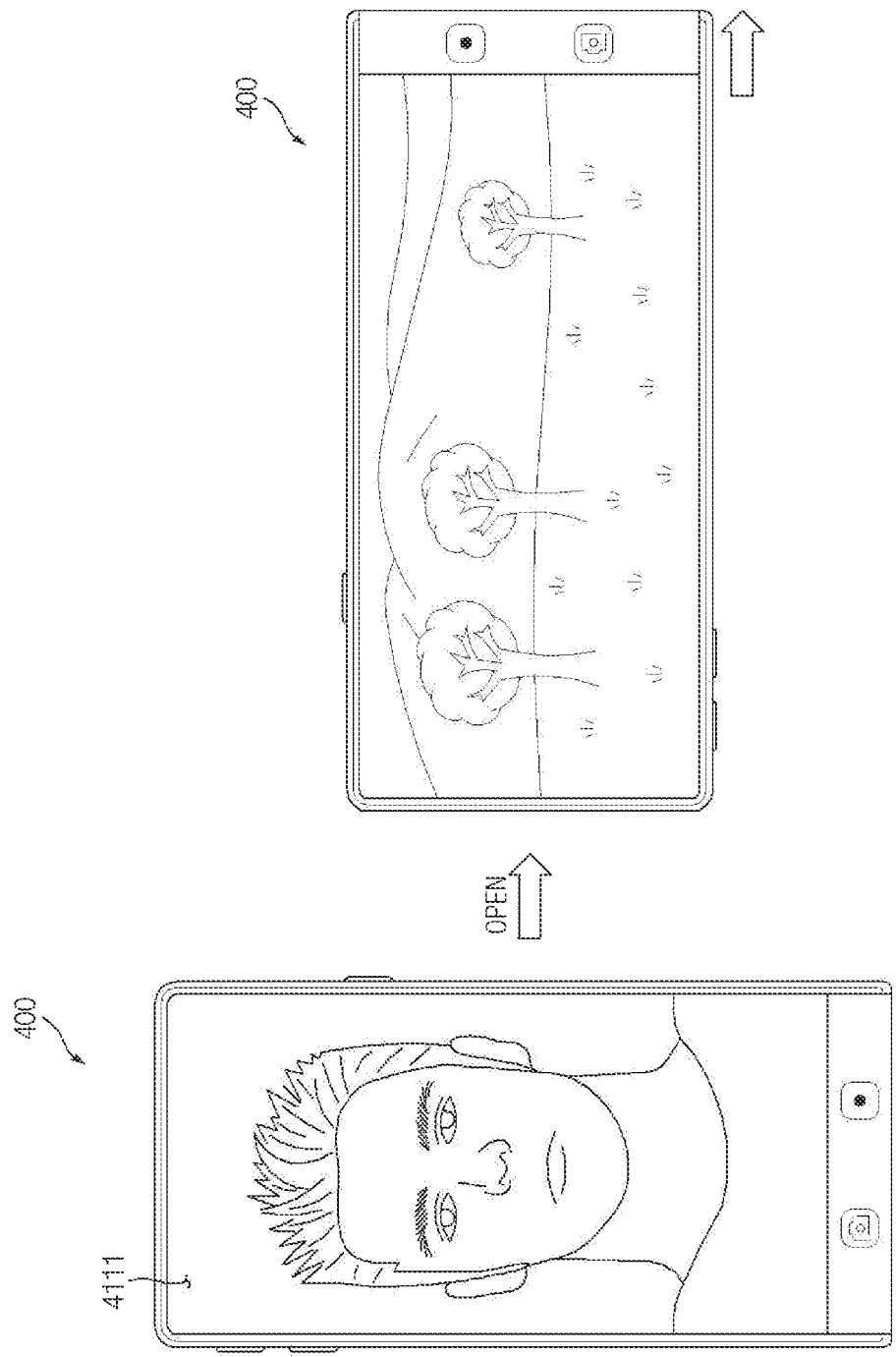
FIG. 9E is a diagram illustrating a third operation example of an example electronic device according to an embodiment.
Figure 9F:
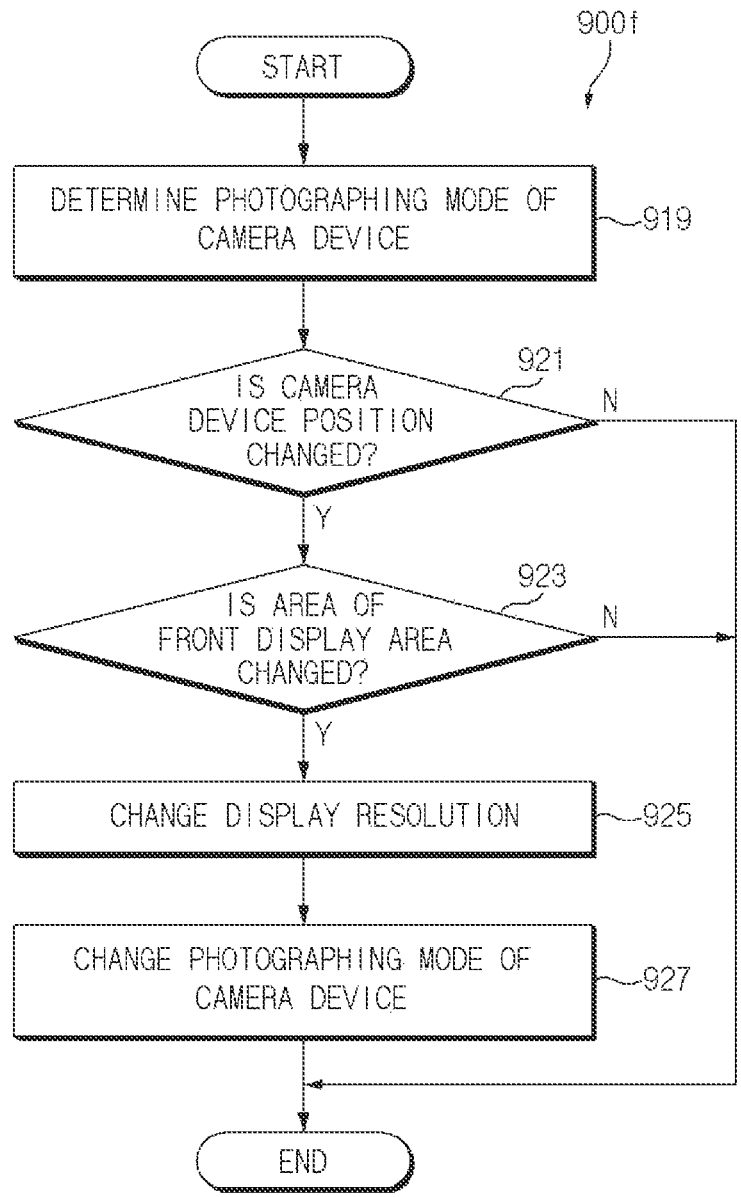
FIG. 9F is a flowchart illustrating an operation process of an example electronic device related to the third operation example according to an embodiment.

FIG. 9E is a diagram illustrating a third operation example of an example electronic device according to an embodiment. FIG. 9F is a flowchart illustrating an operation process 900*f* of an electronic device related to the third operation example according to an embodiment. The operations described with reference to FIG. 9F may be performed at least partially the same as or similar to the operations described with reference to FIG. 9B, and redundant descriptions may not be repeated below.

Referring to FIGS. 9E and 9F, in operation 919, the processor of the electronic device 400 may determine the photographing function (or the photographing mode) of the camera device (490 in FIG. 5A or 5B) which is being operated. According to an embodiment, the photographing function of the camera device 490 may be determined as a selfie photographing function related to the photographing of the front of the electronic device 400 or a landscape photographing function related to the photographing of the rear of the electronic device 400, or the like, but is not limited thereto.

In operation 921, the processor may determine a position change of the camera device 490. For example, based on the position information of the camera device 490 provided from the first sensor (e.g., an acceleration sensor, a gyro sensor, or the like) included in one area of the camera device 490, the processor may determine the position change of the camera device 490.

When it is determined that the position of the camera device 490 is changed, in operation 923, the processor may determine the change in the area of the front display area 4111 of the electronic device 400. In this regard, the processor may obtain the position information of the second structure 120 from the second sensor (e.g., a position sensor, or the like) included in the second structure (120 of FIG. 1A) of the electronic device 400, and may determine whether the electronic device 400 is in the open or closed state due to the motion of the second structure 120, based on the obtained position information. In an embodiment, when the electronic device 400 is determined to be in the closed state, the area of the front display area 4111 may be reduced and the processor may determine that the lens (497 of FIG. 6) of the camera device 490 faces toward the front of the electronic device 400. Correspondingly, when the electronic device 400 is determined to be in the open state, the area of the front display area 4111 is expanded and the processor may determine that the lens 497 of the camera device 490 faces toward the rear of the electronic device 400.

In operation 925 and operation 927, the processor may change the resolution of the display (e.g., the display device 1060 of FIG. 10) of the electronic device 400 and the photographing function of the camera device 490 corresponding to the open or closed state of the electronic device 400 and the position the lens 497. For example, when the photographing function of the camera device 490 is determined as the selfie photographing function in operation 919, and the electronic device 400 is determined to be in the open state in operation 923, so that it is determined that the lens 497 of the camera device 490 faces toward the rear of the electronic device 400, the processor may change the selfie photographing function, which is in operation, to the landscape photographing function. Alternatively, when the photographing function of the camera device 490 in operation is determined as the landscape photographing function and the electronic device 400 is determined to be in the closed state so that it is determined that the lens 497 of the camera device 490 faces toward the front of the electronic device 400, the processor may change the landscape photographing function to the selfie photographing function.

According to various example embodiments described above, an electronic device may include a first structure including a first plate, the first plate including a first surface and a second surface facing in a direction opposite the first surface, a second structure including a second plate facing the second surface of the first plate and a first side wall extending from the second plate, a flexible touch screen display, and a camera device arranged between the first structure and the second structure.

According to various example embodiments, the first structure may be movable between an open state and a closed state with respect to the second structure in a first direction with respect to the second plate.

According to various example embodiments, the first structure may be located at a first distance from the first side wall in the closed state of the first structure and the first structure may be located at a second distance greater than the first distance from the first side wall in the open state of the first structure.

According to various example embodiments, the flexible touch screen display may include a planar portion extending across at least a portion of the first surface and mounted on the first surface, the planar portion having a first width in a second direction perpendicular to the first direction, and a bendable portion extending from the planar portion and located in a space between the first side wall and the first structure from the planar portion in the closed state of the first structure.

According to various example embodiments, the bendable portion may include a first portion extending from one end of the planar portion and having a width equal to the first width.

According to various example embodiments, when the first structure transitions from the closed state to the open state, the first portion of the bendable portion viewed from above the first plate may be drawn from the space between the first side wall and the first structure to form a substantially planar surface between the planar portion and the first side wall.

According to various example embodiments, the camera device may rotate to face at least one of the first structure or the second structure corresponding to the state transition of the first structure.

According to various example embodiments, the electronic device may further include a rollable module including a roller arranged between the first structure and the second structure and configured to move the first structure in the first direction with respect to the second structure.

According to various example embodiments, the camera device may include a shaft having one end connected to an area of the rollable module, a gear through which the shaft passes, and a camera module arranged on an opposite end of the shaft and coupled with the gear.

According to various example embodiments, the rollable module may include a multi joint rail extending in the first direction.

According to various example embodiments, the gear may be arranged to be engaged with the multi joint rail.

According to various example embodiments, the multi joint rail may move in the first direction corresponding to a movement of the first structure in the first direction.

According to various example embodiments, a location of the camera device may be changed relative to the multi-joint rail when the multi-joint rail is moved.

According to various example embodiments, the gear may be rotated on the multi joint rail corresponding to the movement of the multi joint rail while being engaged with the multi-joint rail.

According to various example embodiments, the location of the camera module may be changed corresponding to the rotation of the gear.

According to various example embodiments, the camera device may be located at a first position with respect to the multi joint rail when the first structure is maintained in the closed state.

According to various example embodiments, the camera module may include at least one lens arranged in an area.

According to various example embodiments, the lens may be positioned toward an upper side of the first structure when the camera device is located at the first position.

According to various example embodiments, the first plate may include a first aperture configured to support a view angle of the at least one lens toward a first area corresponding to the camera device in the first position.

According to various example embodiments, the flexible touch screen display may include at least one conductive line arranged to avoid at least a portion of the camera module or to not overlap at least a portion of the camera module in a second area of the planar portion corresponding to the camera device in the first position.

According to various example embodiments, the camera device may be located at a second position spaced apart from the first position by a distance that the first structure moves from the first position while transitioning to the open state, with respect to the multi joint rail when the first structure is kept in the open state.

According to various example embodiments, the lens may be positioned toward a lower side of the second structure when the camera device is located at the second position.

According to various example embodiments, the second plate may include a second aperture configured to support a view angle of the at least one lens toward a third area corresponding to the camera device in the second position.

According to various example embodiments, the electronic device may further include a window cover arranged below the second structure to shield an opening formed in the second plate.

According to various example embodiments, the window cover may include a third aperture configured to support a view angle of the at least one lens toward a fourth area corresponding to the camera device in the second position.

According to various example embodiments, the third aperture may be shielded with a substantially transparent material.

According to various example embodiments described above, an electronic device may include a first plate, a second plate arranged below the first plate, a rollable module comprising a roller arranged between the first and second plate to move the first plate with respect to the second plate in a first direction and in a second direction opposite to the first direction, a camera device arranged between the first and second plates and including at least one lens in an area, and a flexible touch screen display having at least a part guided by the rollable module to extend from an upper side of the first plate to between the rollable module and the second plate.

According to various example embodiments, the camera device may be located at a first position with respect to the rollable module when the first plate is in a closed state with respect to the second plate, and the lens may be located toward an upper side of the first plate.

According to various example embodiments, the camera device may be located at a second position with respect to the rollable module when the first plate moves in the first direction in the closed state and is in an open state with respect to the second plate, and the lens may be located toward a lower side of the second plate.

According to various example embodiments, the rollable module may include a multi-joint rail extending in the first or second direction.

According to various example embodiments, the camera device may include a shaft having one end connected to an area of the rollable module, a gear through which the shaft passes, the gear being engaged with the multi joint rail, and a camera module arranged on an opposite end of the shaft and coupled with the gear.

According to various example embodiments, the multi joint rail may move in a moving direction of the first plate corresponding to a movement of the first plate.

According to various example embodiments, a location of the camera device may be changed relative to the multi-joint rail when the multi-joint rail is moved.

According to various example embodiments, the gear may be rotated on the multi joint rail corresponding to the movement of the multi joint rail while being engaged with the multi-joint rail.

According to various example embodiments, the flexible touch screen display may include a planar portion arranged over the first plate, and a bendable portion extending from the planar portion to between the rollable module and the second plate.

According to various example embodiments, the flexible touch screen display may include at least one conductive line arranged to avoid at least a portion of the camera module or to not overlap the at least a portion of the camera module in a first area of the planar portion corresponding to the camera device in the first position.

FIG. 10 is a diagram illustrating an example electronic device in a network environment according to an embodiment.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector), The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various example embodiments disclosed in the disclosure may be various types of devices. The electronic device may include, for example, and without limitation, at least one of a portable communication device (e.g., a smartphone), a computer device, a portable multimedia device, a mobile medical appliance, a camera, a wearable device, a home appliance, or the like. The electronic device according to an embodiment of the disclosure should not be limited to the above-mentioned devices.

It should be understood that various embodiments of the disclosure and terms used in the embodiments are not intended to limit technologies disclosed in the disclosure to the particular forms disclosed herein; rather, the disclosure should be understood to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may refer, for example, to a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 1040) including an instruction stored in a machine-readable storage media (e.g., the internal memory 1036 or the external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated by a compiler or executable by an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

According to various embodiments, a single camera may be mounted in a structure that rotates corresponding to a structural deformation of the electronic device or the deployment of the rolled flexible display, so that it may be supported to photograph the images (e.g., a still image or video) of the front and rear of the electronic device.

According to various embodiments, a plurality of cameras for each of the front and rear photographing of the electronic device may be unified, thereby reducing the manufacturing cost of the electronic device or efficiently designing the internal space.

In addition, various effects that are directly or indirectly understood through the disclosure may be provided.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

The invention claimed is:

1. An electronic device comprising:
 a first structure comprising a first plate;
 a second structure comprising a second plate that is slidable relative to the first structure;
 a flexible display, at least portion of which is configured to move together with the first structure; and
 a camera device including a lens and disposed between at least the first structure and the second structure,
 wherein the flexible display is configured to expand or reduce a front display area visually exposed at a front surface of the electronic device based on a sliding operation between the first structure and the second structure,
 wherein the electronic device is configured to be transitioned between a basic state in which a size of the front display area is a first size and an extended state in which the size of the front display area is a second size larger than the first size,
 wherein the camera device is configured to rotate between the first structure and the second structure when the electronic device is transitioned from the basic state to the extended state and/or from the extended state to the basic state,
 wherein the camera device is configured to rotate so that the lens faces the first plate and the flexible display, or faces the second plate,
 wherein the first plate includes a first aperture to allow the lens to receive light, and the second plate includes a second aperture to allow the lens to receive light, and
 wherein the flexible display includes a first area partially aligned with the first aperture, wherein the first area of the flexible display is configured to support a view angle of the lens to allow the lens to receive light.

2. The electronic device of claim 1, wherein the camera device is configured to rotate such that the lens faces a direction of the front surface of the electronic device in one of the basic state and the extended state, and the lens faces a direction of a rear surface opposite to the front surface in the other of the basic state and the extended state.

3. The electronic device of claim 1, further comprising:
 a processor functionally connected to the camera device,
 wherein the camera device is configured to operate in a first photographing mode in the basic state and to operate in a second photographing mode in the extended state,
 wherein the processor is configured to:
 display a first preview image obtained from the camera device based on the first photographing mode on the front display area in the basic state, and
 display a second preview image obtained from the camera device based on the second photographing mode on the front display area in the extended state.

4. The electronic device of claim 3, wherein one of the first photographing mode and the second photographing mode is a selfie photographing mode corresponding to photographing an image in a direction of the front surface of the electronic device, and another one of the first photographing mode and the second photographing mode is a normal photographing mode corresponding to photographing an image in a direction of a rear surface opposite to the front surface.

5. The electronic device of claim 4, wherein the processor is further configured to:
   detect the basic state or the extended state of the electronic device,
   detect the lens position related to a direction the lens is facing, and
   change a photographing mode of the camera device to the first photographing mode or the second photographing mode based on at least one of the state of the electronic device and the lens position.

6. The electronic device of claim 5, wherein the camera device is positioned such that the lens faces the front surface in the basic state, and the lens faces the rear surface in the extended state,
   wherein the processor is further configured to:
      operate the camera device in the selfie photographing mode in the basic state,
      detect an operation in which the electronic device is transitioned from the basic state to the extended state,
      detect a state in which the lens of the camera device is positioned to face the rear surface,
      change the photographing mode of the camera device from the selfie photographing mode to the normal photographing mode.

7. The electronic device of claim 1, wherein the camera device is configured to rotate so that the lens faces the first structure and the flexible display in the basic state and rotate such that the lens faces the second structure in the extended state, and
   wherein the lens at least partially overlaps the first aperture in the basic state, and at least partially overlaps the second aperture in the extended state.

8. The electronic device of claim 1,
   wherein the first area includes a partial area of the front display area or an opening area formed in the front display area.

9. The electronic device of claim 1, wherein the first plate includes a first surface and a second surface facing opposite to the first surface, and
   wherein the second plate faces the second surface of the first plate.

10. The electronic device of claim 1, wherein the lens is positioned toward the first area of the flexible display and the first aperture of the first plate in the basic state, and is positioned toward the second aperture of the second plate in the extended state.

11. The electronic device of claim 9, wherein the flexible display includes a planar portion mounted on the first surface and a bendable portion extending from the planar portion,
   wherein at least a portion of the bendable portion is located in a space between the first plate and the second plate in the basic state, and is configured to be drawn from the space between a side wall extending from the second structure and the first structure based on the transitioning from the basic state to the extended state, and
   wherein the first area is formed on a portion of the planar portion.

12. The electronic device of claim 1, wherein the first plate includes a first surface on which a portion of the flexible display is mounted and a second surface facing opposite to the first surface,
   wherein the second plate faces the second surface of the first plate,
   wherein the camera device is arranged between the first plate and the second plate, and overlaps the flexible display when the front display area is viewed from above.

13. The electronic device of claim 1, further comprising:
   a rollable module arranged between the first structure and the second structure and configured to move the first structure in a first direction with respect to the second structure,
   wherein the camera device further includes:
   a camera module in which the lens is disposed,
   a gear coupled to the camera module, and
   a shaft through the gear and on which the camera module is arranged.

14. The electronic device of claim 13, wherein the rollable module includes a multi-joint rail extending in the first direction, and
   wherein the gear is arranged to be engaged with the multi-joint rail.

15. The electronic device of claim 14, wherein the multi-joint rail is configured to move in the first direction corresponding to a movement of the first structure in the first direction, and
   wherein a location of the camera device is changed relative to the multi-joint rail based on the multi-joint rail being moved.

16. The electronic device of claim 15, wherein the gear is configured to rotate on the multi-joint rail corresponding to the movement of the multi-joint rail while being engaged with the multi-joint rail, and
   wherein the location of the camera module is configured to change based on the rotation of the gear.

17. An electronic device comprising:
   a first structure including a first plate, the first plate including a first surface and a second surface facing a direction opposite the first surface;
   a second structure including a second plate facing the second surface of the first plate;
   a flexible display, at least portion of which is disposed on the first structure and configured to move together with the first structure;
   a rollable module slidably connecting the first structure and the second structure and guiding the movement of the flexible display; and
   a camera device disposed between the first plate and the second plate, the camera device including a camera module on which a lens is disposed,
   wherein the flexible display is configured to expand or reduce a front display area visually exposed to a front surface of the electronic device based on a sliding operation between the first structure and the second structure,
   wherein the electronic device is transitioned between a basic state in which the size of the front display area is a first size and an extended state in which the size of the front display area is a second size larger than the first size,
   wherein the camera module is configured to rotate between the first plate and the second plate based on an operation in which the electronic device is transitioned from at least one of the basic state to the extended state, or from the extended state to the basic state,
   wherein the lens is configured to face the first plate and the flexible display in the basic state, and face the second plate in the extended state, wherein the first plate, the second plate and the flexible display are configured to support an angle of view of the lens, wherein the camera module is disposed in an internal space of the electronic device and overlaps the flexible display when the front display area is viewed from above in the basic state and the extended state, wherein the lens is configured to receive light through a first area of the first plate and a second area of the flexible display partially aligned with the first area in the basic state, wherein the first area includes a first aperture or a first transparent area, and wherein the second area includes an opening area penetrating a portion of the flexible display.

18. The electronic device of claim 17, wherein the lens is configured to receive light through a third area of the second plate in the extended state, and wherein the third area includes a second aperture or a second transparent area.

19. The electronic device of claim 1, further comprising:
a processor functionally connected to the camera device, wherein the processor is configured to:
control the camera device to operate in a first photographing mode in the basic state and a second photographing mode in the extended state,
detect the basic state or the extended state of the electronic device,
detect the lens position related to a direction the lens is facing, and
change a photographing mode of the camera device to the first photographing mode or the second photographing mode based on at least one of the state of the electronic device and the lens position.

20. The electronic device of claim 1, wherein the basic state is a substantially closed state, and the extended state is an open state that is more open than is the basic state.

21. An electronic device comprising:
a first structure including a first plate, the first plate including a first surface and a second surface facing a direction opposite the first surface;
a second structure including a second plate facing the second surface of the first plate;
a flexible display, at least portion of which is disposed on the first structure and configured to move together with the first structure;
a rollable module slidably connecting the first structure and the second structure and guiding the movement of the flexible display; and
a camera device disposed between the first plate and the second plate, the camera device including a camera module on which a lens is disposed,
wherein the flexible display is configured to expand or reduce a front display area visually exposed to a front surface of the electronic device based on a sliding operation between the first structure and the second structure,
wherein the electronic device is transitioned between a basic state in which the size of the front display area is a first size and an extended state in which the size of the front display area is a second size larger than the first size,
wherein the camera module is configured to rotate between the first plate and the second plate based on an operation in which the electronic device is transitioned from at least one of the basic state to the extended state, or from the extended state to the basic state,
wherein the lens is configured to face the first plate and the flexible display in the basic state, and face the second plate in the extended state,
wherein the first plate includes a first aperture to allow the lens to receive light in the basic state, and the second plate includes a second aperture to allow the lens to receive light in the extended state, and
wherein the flexible display includes a first area partially aligned with the first aperture, and the first area of the flexible display is configured to support a view angle of the lens to allow the lens to receive light in the basic state.

* * * * *